United States Patent [19]
Olmsted et al.

[11] Patent Number: 5,456,604
[45] Date of Patent: Oct. 10, 1995

[54] METHOD AND SYSTEM FOR SIMULATING VEHICLE OPERATION USING SCALE MODELS

[76] Inventors: Robert A. Olmsted, 10400 Belmont Rd., Minnetonka, Minn. 55305; Jonathan C. Rice, 1495 Goodrich Ave., St. Paul, Minn. 55105

[21] Appl. No.: 139,553

[22] Filed: Oct. 20, 1993

[51] Int. Cl.[6] .............................. G09B 9/04; G09B 19/16
[52] U.S. Cl. .............................. 434/62; 434/29; 434/365; 364/578
[58] Field of Search .................................. 434/29, 30, 45, 434/60, 61, 62, 66, 219, 305, 307 R, 308, 365, 372, 373; 446/230, 454, 465, 468; 273/86 R, 85 G, 433, 434, 438, 440, 442; 246/169 A, 167 R; 364/424.06, 424.05, 578; 280/29; 348/61, 114, 117, 118

[56] References Cited

U.S. PATENT DOCUMENTS

| | | |
|---|---|---|
| 867,180 | 9/1907 | Woods . |
| 1,805,167 | 5/1931 | Fitzgerald . |
| 1,942,167 | 1/1934 | Handy . |
| 1,945,454 | 1/1934 | Trubert . |
| 1,966,031 | 7/1934 | Handy . |
| 1,974,330 | 9/1934 | Groff . |
| 1,997,748 | 4/1935 | Rosenthal . |
| 2,013,947 | 9/1935 | Basselier . |
| 2,019,690 | 11/1935 | McKeige . |
| 3,600,843 | 8/1971 | Becker . |
| 3,675,586 | 7/1972 | Haddad . |
| 3,777,410 | 12/1973 | Robinson . |
| 3,858,347 | 1/1975 | Horn et al. . |
| 3,936,955 | 2/1976 | Gruen et al. ............................ 434/62 X |
| 4,041,283 | 8/1977 | Mosier . |
| 4,051,783 | 10/1977 | Caliri . |
| 4,279,395 | 7/1981 | Boggio et al. . |
| 4,281,994 | 8/1981 | Dell et al. ............................ 364/578 X |
| 4,349,196 | 9/1982 | Smith, III et al. . |
| 4,352,664 | 10/1982 | Morrison et al. ....................... 434/44 X |
| 4,817,948 | 4/1989 | Simonelli ............................... 434/71 X |
| 4,827,438 | 5/1989 | Nickles et al . |
| 4,853,883 | 8/1989 | Nickles et al. . |
| 4,855,822 | 8/1989 | Narendra et al. ......................... 348/114 |
| 4,949,119 | 8/1990 | Mongrief et al. . |
| 4,952,152 | 8/1990 | Briggs et al. . |
| 5,015,189 | 5/1991 | Wenzinger, Jr. ....................... 434/62 X |
| 5,053,969 | 10/1991 | Booth . |
| 5,073,750 | 12/1991 | Coron . |
| 5,209,662 | 5/1993 | Fujita et al. . |

FOREIGN PATENT DOCUMENTS

| | | | |
|---|---|---|---|
| 0290364 | 11/1988 | European Pat. Off. .................. | 434/66 |
| 0096792 | 4/1990 | Japan ....................................... | 434/66 |
| 481442 | 12/1969 | Switzerland ............................. | 434/30 |
| 2128842 | 5/1984 | United Kingdom . | |

*Primary Examiner*—Joe Cheng
*Attorney, Agent, or Firm*—Vidas, Arrett & Steinkraus

[57] ABSTRACT

A method and apparatus for controlling model vehicles in a manner which accurately simulates the operation of real vehicles. Parameters relating to operational characteristics of a vehicle, environmental conditions, loading conditions, operator control settings, and physical characteristics of a controllable model are processed by a computer to determine appropriate control functions to a model allowing it to accurately replicate the operation of a real vehicle operating under the same set of conditions.

12 Claims, 18 Drawing Sheets

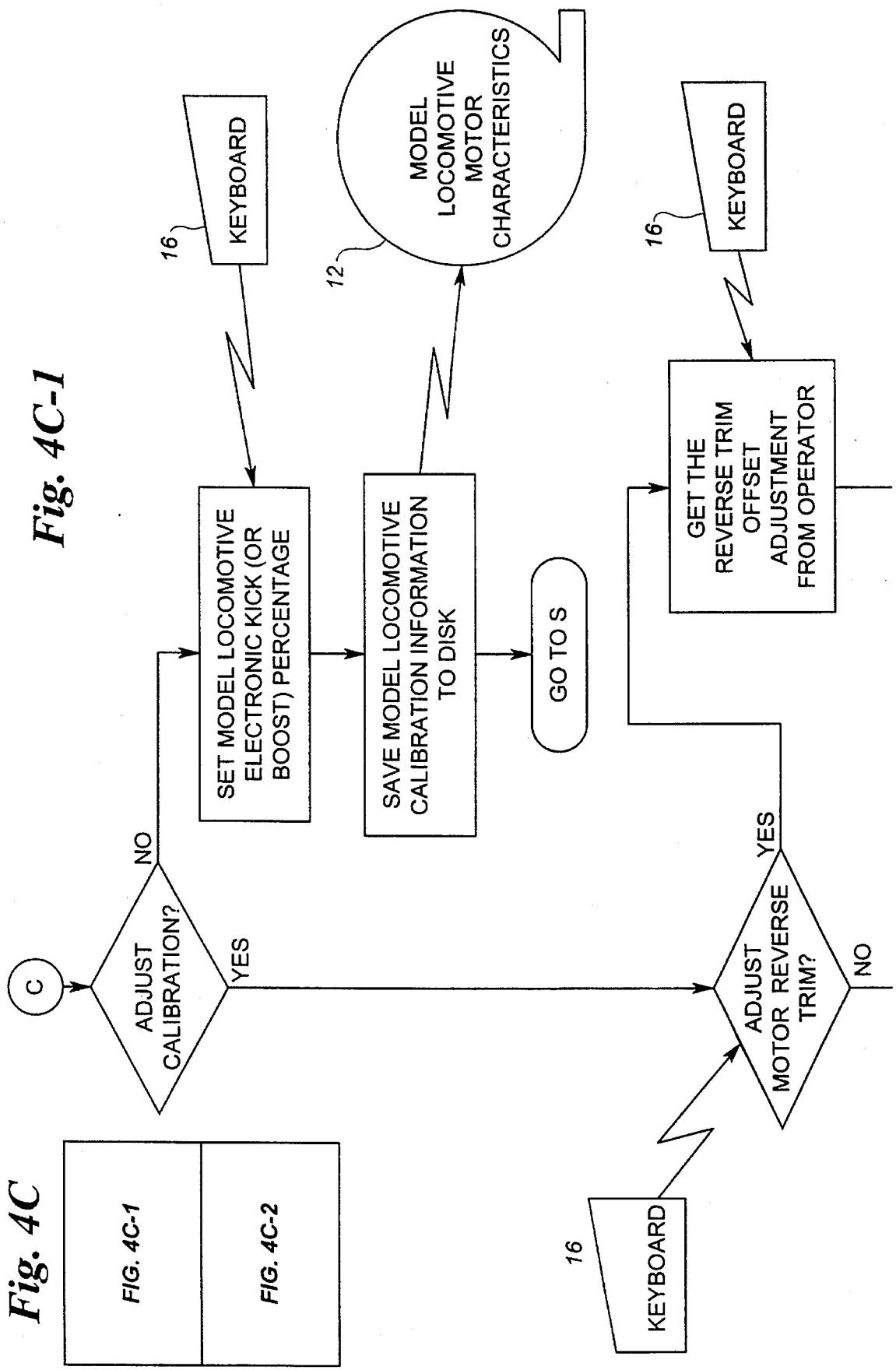

*Fig. 5A-2*
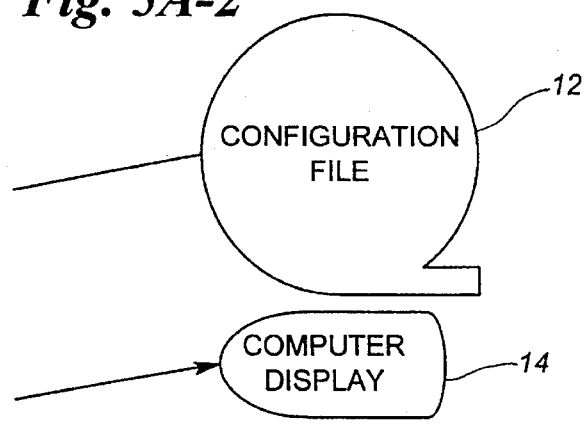
*Fig. 5A*
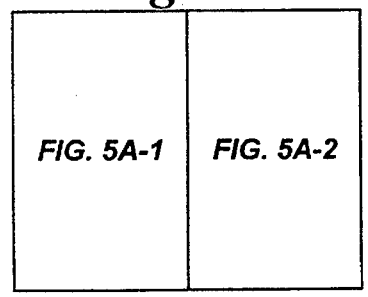
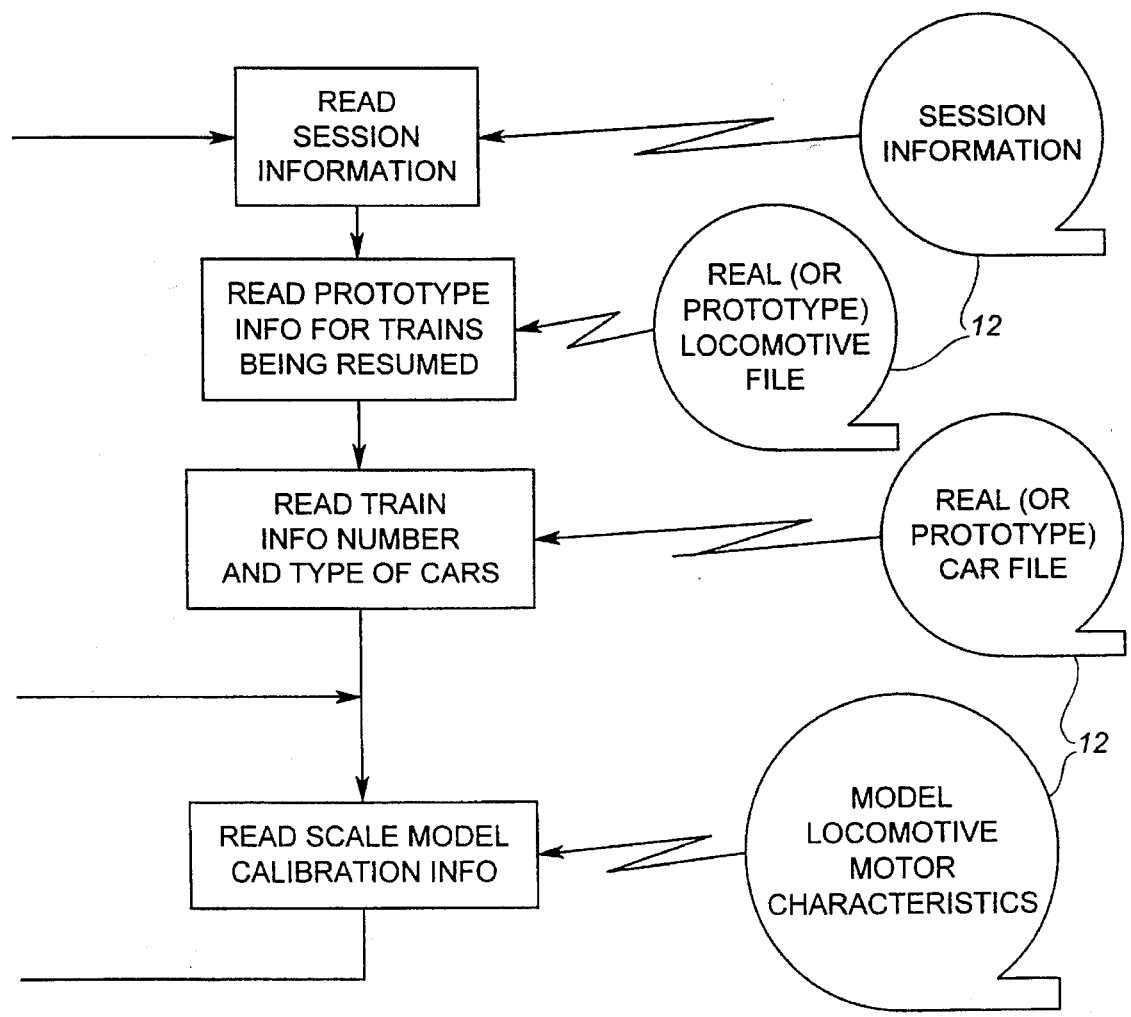

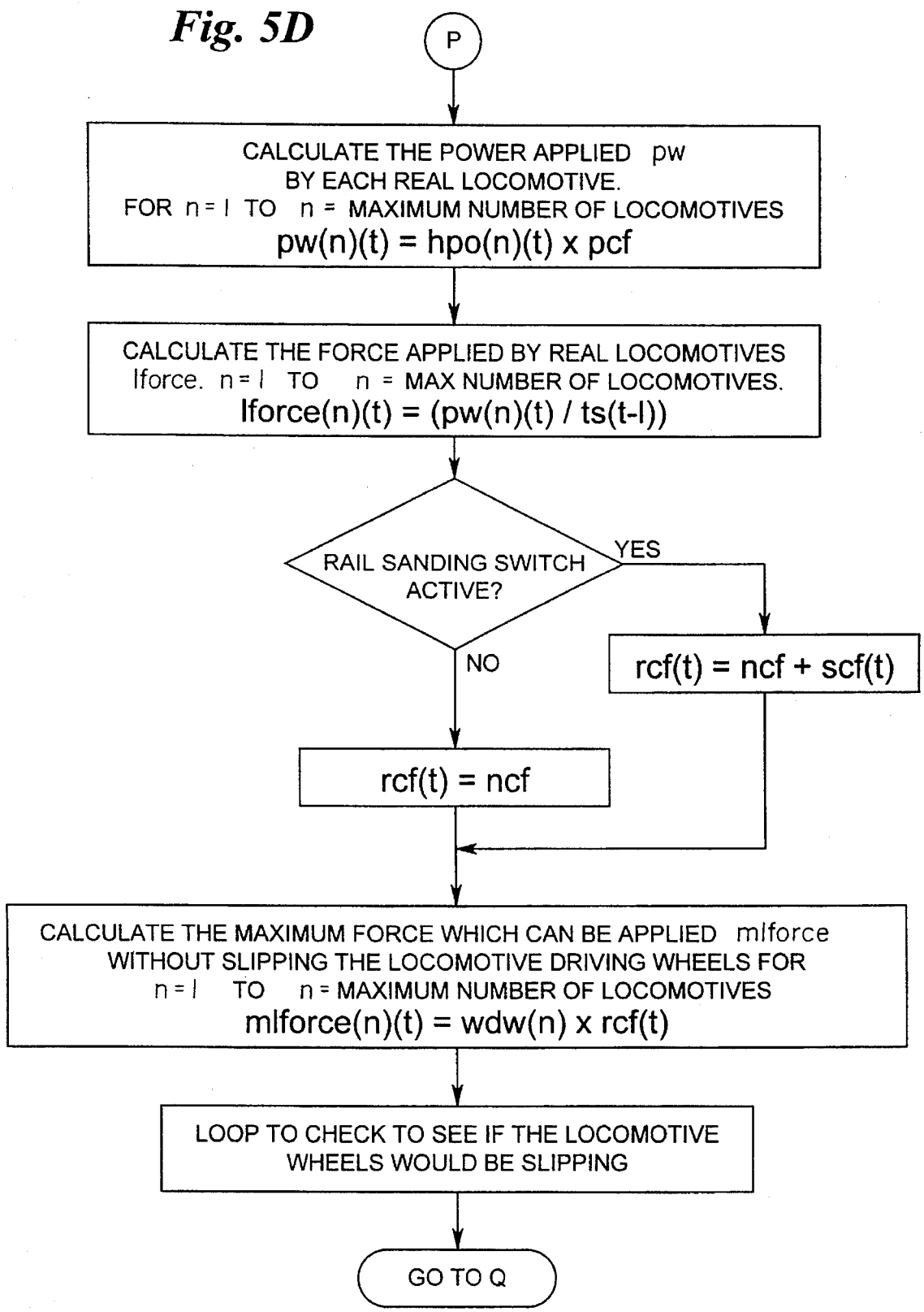

METHOD AND SYSTEM FOR SIMULATING VEHICLE OPERATION USING SCALE MODELS

BACKGROUND—FIELD OF THE INVENTION

This invention relates to scale models, specifically to an improved scale model control system.

BACKGROUND—DESCRIPTION OF PRIOR ART

Scale models in general and model railroads in particular have always focused on the aspect of realism. From the onset, modelers and manufacturers alike have spent considerable effort to achieve a lifelike appearance with their models. U.S. Pat. Nos. 1,974,330 to Groff, 1934 Sep. 18 and U.S. Pat. No. 2,019,690 to McKeige, 1935 Nov. 5, discusses model trains which resemble, in appearance, streamlined railway trains from that specific era with features which enhance their realistic appearance. Many previous inventions such as: U.S. Pat. No. 1,942,167 to Handy, 1934 Jan. 2, and U.S. Pat. No. 1,966,031 to Handy, 1934 Jul. 10, both detail ornamental additions which enhance the realistic appearance of a model railroad. What modelers and model railroad equipment manufacturers have missed is the aspect of realistic operation.

Model trains do not operate like real trains due to the fact that model locomotives are propelled by small electric motors with a different set of operational characteristics than the power plants of real locomotives. An actual locomotive is controlled by a system in which the operator varies the horsepower produced by the power plant of the locomotive and the speed of the train is determined by external physical conditions. A typical model train control, such as that described in U.S. Pat. No. 867,180 to Woods, 1907 Sep. 24, will vary the voltage and polarity to the motor of the locomotive which will control only the speed and direction of travel. Existing model railroad control systems directly control the speed of the train by varying the track voltage. At a specific voltage the model locomotive will, with little variation, travel at the same scale speed because the loading effects of a model train are considerably different than that of a real train. External conditions such as wind resistance, wet rails, friction, gravity, etc. have little or no influence on the acceleration, deceleration, or scale speed of model trains but have a dramatic impact on the performance of real locomotives and trains.

With this in mind, manufacturers of model railroad controls, generally referred to as a throttles, added the capability to delay the rate at which a model locomotive changes its speed. Any variation in throttle setting would not be immediately realized in the model, providing the illusion of momentum. This predefined delay rate fails to accurately replicate the combined physical effects of gravity, load, rail conditions, horsepower, wind resistance, number of locomotives, and other variables that would affect a real train. These "momentum" model railroad control systems do not have the means to automatically adjust the delay parameters for a given model train operating under a given set of conditions. Additionally, existing model railroad throttles still lack the type of controls and indicators that are often found on real locomotives. Realistic control functions found on real locomotives as: notched or continuous throttle, brake control, sand switch, accelerometer, speedometer, odometer, brake pressure gauge, wheel slip indicator and other operational status information are virtually nonexistent on existing model railroad throttles.

Model railroad locomotives and cars vary dramatically in terms of quality, construction, and operational characteristics. Due to advances in electric motor technology, bearings, materials, and the like, many newer models will operate more efficiently than older ones and most higher quality locomotives will operate smoother at low speeds than locomotives of lesser quality. The result is that a model of a particular locomotive may move at one scale speed at a given voltage and another model of the same locomotive from another manufacturer could move at a different scale speed at that same voltage. The voltage at which the motor in the locomotive starts moving and stops moving will also vary from model to model. One locomotive may just begin to move at a specific track voltage while another will be moving along at 100 scale miles per hour at the same track voltage. Existing model railroad control systems do not have the capability to identify, retain and recall the individual operational characteristics of a particular scale model locomotive.

The railroad transportation industry has expended considerable effort to add realism to the area of operator training and to determining optimum operational methods for its locomotives. Railway control simulators such as U.S. Pat. No. 4,041,283 to Mosier, 1977 Aug. 9, offered the means to simulate a number of locomotives and a number of cars in a single train operating over a predetermined section of track for this specific purpose. These simulators present information to the operator in the form of a primitive display of train profile information, coupling forces, and brake cylinder pressure. The system was capable of storing information relating to simulation initialization and operating sessions. Additional realism, or accuracy was added to the railway control simulator in U.S. Pat. No. 4,827,438 to Nickels et al. 1989 May 2, through the input of data acquired during a locomotive operating session. System level improvements were introduced as demonstrated in U.S. Pat. No. 4,853,883 to Nickles et al. 1989 Aug. 1, which focused primarily on modernizing the system through the use of multiple microcomputers and making improvements in the number of operators possible and to the display and hard copy capabilities of the system. Output from the Railway control simulator systems are purely informational, no physical control functions other than outputting information or data are performed whatsoever.

An abundance of simulators for other types of vehicles and situations exist that do perform some physical control function. These simulators, such as U.S. Pat. No. 3,858,347 to Horn et at. 1975 Jan. 7, have the capability to manipulate a model, in this case a model airplane. However, the model is in a static position with an airflow passing over it to simulate actual movement. The controls have the capability to adjust rudders, ailerons and flaps and maneuver the model while it is held captive by the stand and base plate. The disadvantage is that the aircraft only simulates movement, it does not actually move. Another aircraft trainer invention that uses a model such as U.S. Pat. No. 3,600,843 to Becker, 1971 Aug. 24, is not based on true simulation. It uses a model suspended from a monofilament line attached to a control stick. As the model slides down the line the operator adjusts the control stick to mimic landing the model or bombing a target. It is difficult to ascertain if the controls of this invention operate in a manner similar to that of an actual aircraft. Many other simulator inventions like: U.S. Pat. No. 3,777,410 to Robinson, 1973 Dec. 11; U.S. Pat. No. 4,952, 152 to Briggs et al. 1990 Aug. 28; U.S. Pat. No. 5,209,662 to Fujita et al. 1993 May 11; offer the operator a realistic perspective by projecting a realistic image of the area being traveled over. Some are even equipped with realistic operator environments and controls that provide feedback in the form of a sensation of movement or inertia. These simulators are primarily static and have no ability to apply control to a moveable and controllable model of any sort.

Model railroad control systems have advanced to a point where they utilize computer technology. U.S. Pat. No. 4,349,196 to Smith, III et al. 1982 Sep. 14, shows a control system utilizing a computer to identify model train cars on a track using optical sensors. The operator manipulates the cars to achieve a predefined order within a set time period. While this tests the skill of the operator, and provides amusement, it does not allow the model train to operate in a manner similar to a real train. Another system, U.S. Pat. No. 5,073,750 to Coron, 1991 Dec. 17, utilizes a dedicated microcomputer to implement a remote control function for an electric toy. In the preferred embodiment, the microcomputers send and receive information to allow control of a model train and its accessories from a remote distance. The computer and remote control capability are controlling only the exchange of the information, the operator is providing the input of the information. The computer in the system does not perform any simulation or management function.

Existing model railroad control systems as well as simulators in general suffer from a number of deficiencies:

(a) Existing model railroad control systems do not control model locomotives in a manner similar to real locomotives.

(b) Existing model railroad control systems are not able to determine the individual operating characteristics of a particular model locomotive or locomotives operating together.

(c) Existing model railroad control systems are not able to save the individual operating characteristics of a particular model locomotive or locomotives operating together.

(d) Existing model railroad control systems are not able to recall the individual operating characteristics of a particular model locomotive or locomotives operating together.

(e) Existing model railroad control systems do not have the same type of controls and indicators found on real locomotives.

(f) Existing model railroad control systems do not use performance data relating to real locomotives.

(g) Existing model railroad control systems do not take into account real world physical effects that impact the performance of a real train.

(h) Existing railway simulators are limited to simulating a single train operating on a single track.

(i) Existing railway simulators are built utilizing one or more specially designed dedicated computer systems.

(j) Railway simulators output or display information only, they do not apply the information to any external physical activity or operation.

(k) Existing simulators are primarily static and have no ability to apply control to a model which is capable of movement and control.

OBJECTS AND ADVANTAGES

Accordingly, several objects of the present invention are:

(a) to provide a model railroad control system which controls model locomotives in a manner similar to real locomotives;

(b) to provide a model railroad control system which can determine the individual operating characteristics of a particular model locomotive or locomotives operating together;

(c) to provide a model railroad control system which can save the individual operating characteristics of a particular model locomotive or locomotives operating together;

(d) to provide a model railroad control system which can recall the individual operating characteristics of a particular model locomotive or locomotives operating together;

(e) to provide a model railroad control system which has controls and indicators similar to those found on a real locomotive;

(f) to provide a model railroad control system which utilizes performance data relating to the actual locomotive or locomotives being modeled to improve realism;

(g) to provide a model railroad control system which utilizes the real world physical effects present to a real train to determine the performance of a model locomotive or locomotives;

(h) to provide a railway simulator which can simulate multiple trains operating on multiple tracks in real time;

(i) to provide a railway simulator which utilizes a single general purpose computer system which is suitable for other tasks; and (j) to provide a railway simulator which simulates the physical characteristics of single or multiple full size trains and applies the results to a single model train or multiple model trains.

(k) to provide a simulator which has the ability to apply control to a model which is capable of movement.

Further objects and advantages of the invention will become apparent from a careful consideration of the ensuing description and drawings.

DRAWING FIGURES

Figure 1:
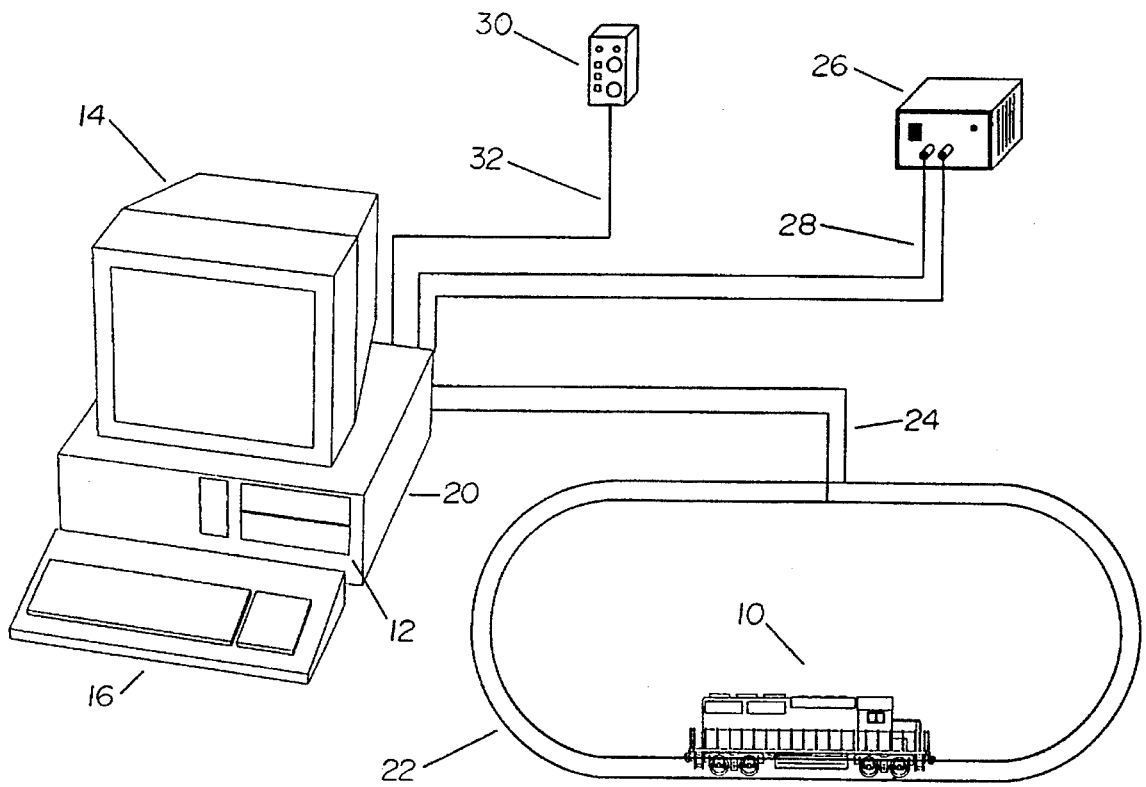
FIG. 1A to 1B show diagrams of the overall system.

FIG. 5 A to 5F shows a flow diagram of the system software and simulation.

REFERENCE NUMERALS IN DRAWINGS

10 model locomotive
12 mass storage system
14 computer display
16 keyboard
20 computer
22 model track
24 model track leads
26 power supply
28 power supply leads
30 walkaround cab
32 multi-conductor walkaround cab cable
112 computer expansion bus
120 expansion bus interface 122 output pulse generator
124 digital to analog converter
126 digital input/output logic
128 analog to digital converter
130 output amplifier
132 output polarity control circuit
134 walkaround cab interface
140 throttle circuit board
210 wheel slip indicator
212 brake control
214 throttle control
216 connect indicator
218 direction switch
220 sand switch
222 emergency stop switch DESCRIPTION—FIGS. 1 To 5

Figure 1B:
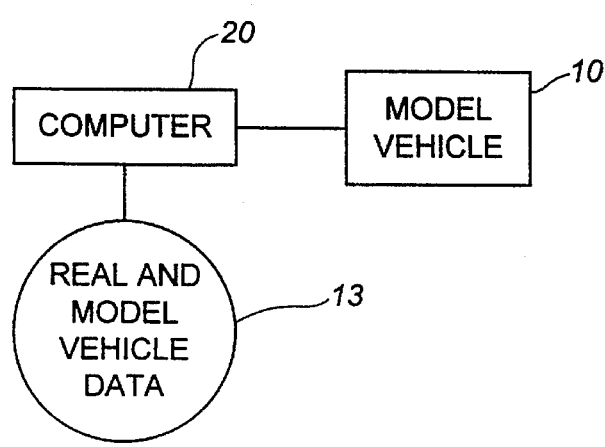
Figure 2:
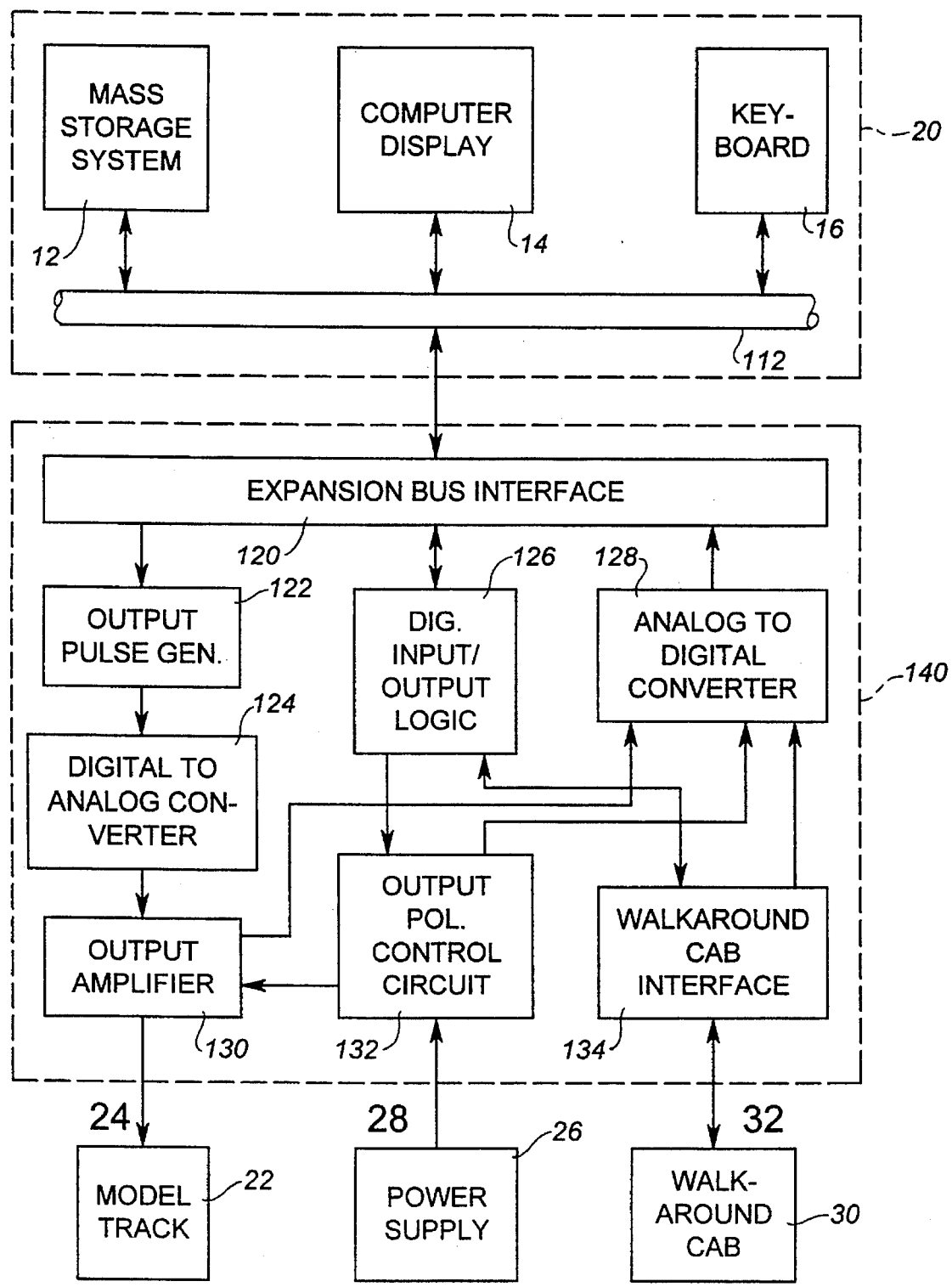
FIG. 2 shows a block diagram of the throttle circuit board, host computer, and connected items.

A typical embodiment of the vehicle simulation system using scale models is illustrated in the overall system diagrams in FIG. 1A and 1B and a throttle circuit board block diagram is illustrated in FIG. 2. A throttle circuit board 140 (FIG. 2) installed in an expansion bus 112 of a computer 20. A power supply 26 is connected to a throttle circuit board 140 installed in a computer 20 through a pair of power supply leads 28. A model vehicle 10 (a locomotive in FIG. 1A, but could be any model vehicle as represented in FIG. 1B, such as a model sea vehicle, a model aircraft or a model land vehicle), resides on model track 22 and is propelled by a voltage supplied through a pair of model track leads 24 which are connected to throttle circuit board 140 installed in computer 20. A walkaround cab 30 is connected through a multi-conductor walkaround cab cable 32 to throttle circuit board 140 installed in computer 20. Computer 20 has user input capability through either a keyboard 16 or walkaround cab 30. Computer 20 can store or retrieve information from a mass storage system 12 and has the capability to display information through the use of a Computer display 14.

Throttle circuit board 140 interfaces to expansion bus 112 of computer 20 through an expansion bus interface 120. Through expansion bus interface 120 an output pulse generator 122 and a digital to analog converter 124 are controlled. The output of digital to analog converter 124 is driven to an output amplifier 130 and onto model track leads 24. Power supply leads 28 connect to an output polarity control circuit 132 and are routed to an output amplifier 130 under the control of a digital input/output control logic 126.

Figure 3:
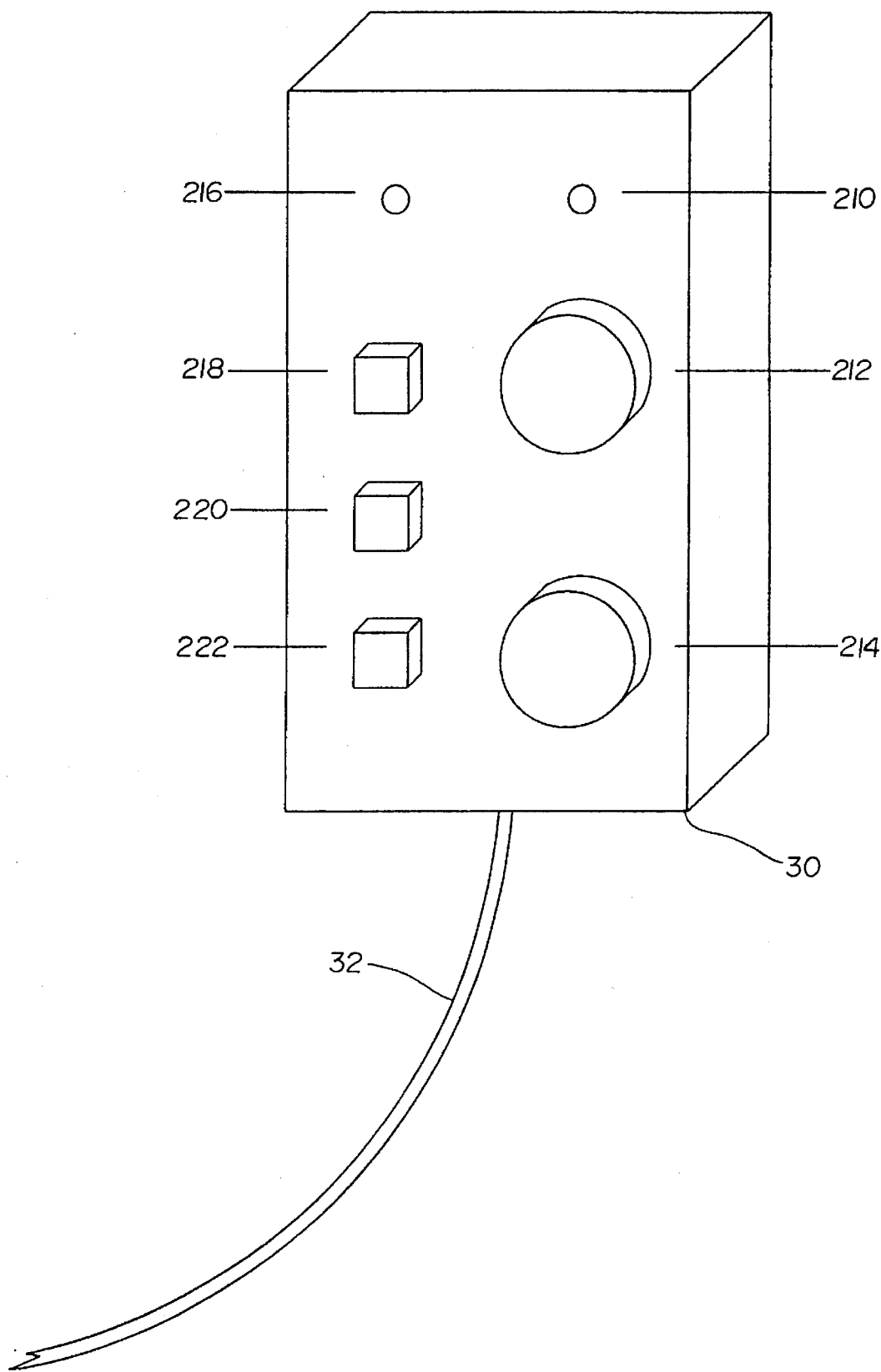
FIG. 3 shows a walkaround cab with controls and indicators.

FIG. 3 shows walkaround cab 30 which houses a direction switch 218, a sand switch 220, an emergency stop switch 222, a connect indicator light emitting diode 216, a wheel slip indicator light emitting diode 210, a brake control 212, and a throttle control 214. The status or control of the aforementioned items are channeled through a walkaround cab interface 134 (FIG. 2) to either an analog to digital converter 128 or to digital input/output control 126. Analog to digital converter 128 monitors power supply 26 output present on power supply leads 28 through output polarity control circuit 132 and reads the settings of brake control 212 and throttle control 214 on walkaround cab 30.

Figure 4A:
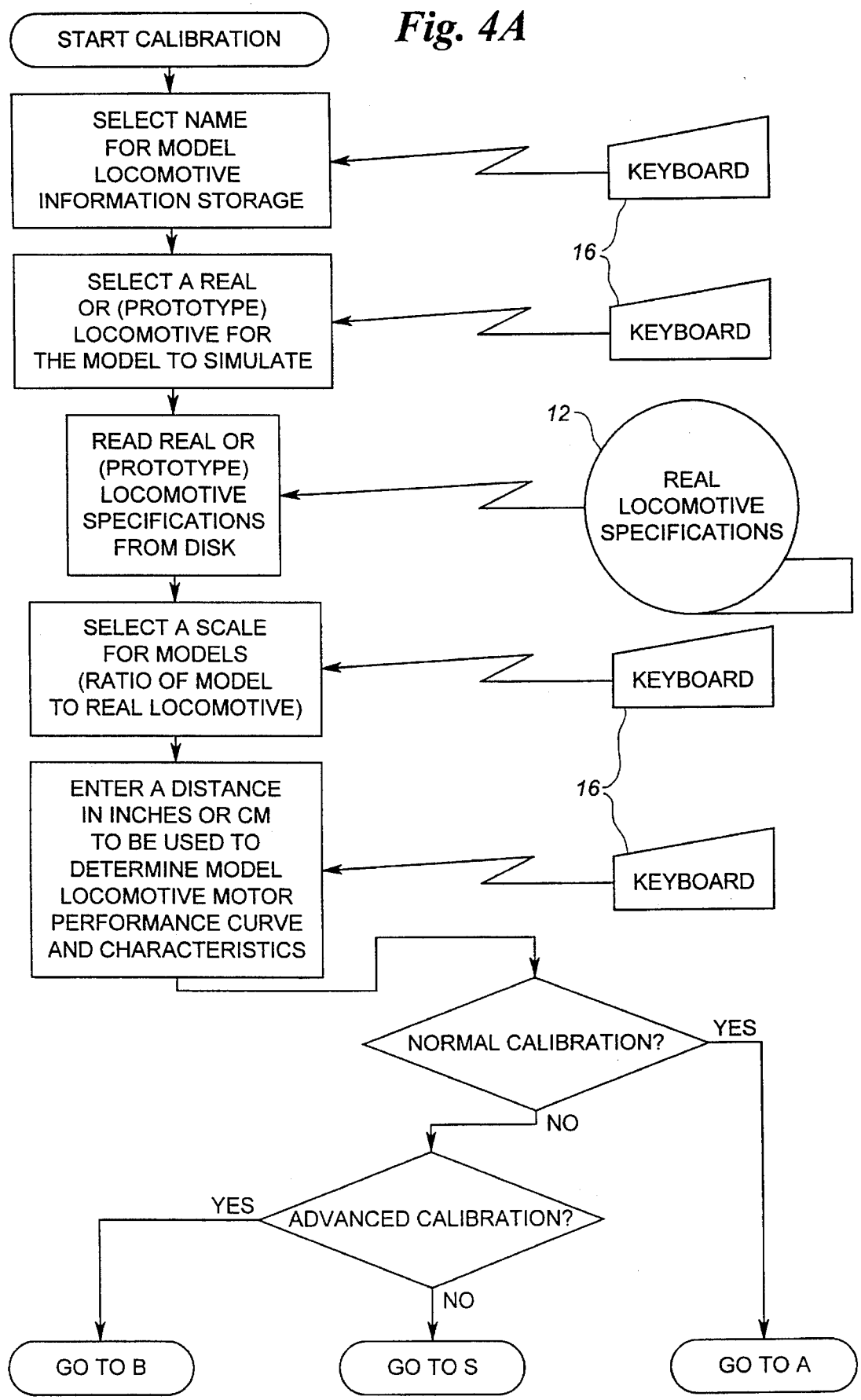
FIG. 4A to 4F show a flow diagram of the model calibration process.
Figure 4B:
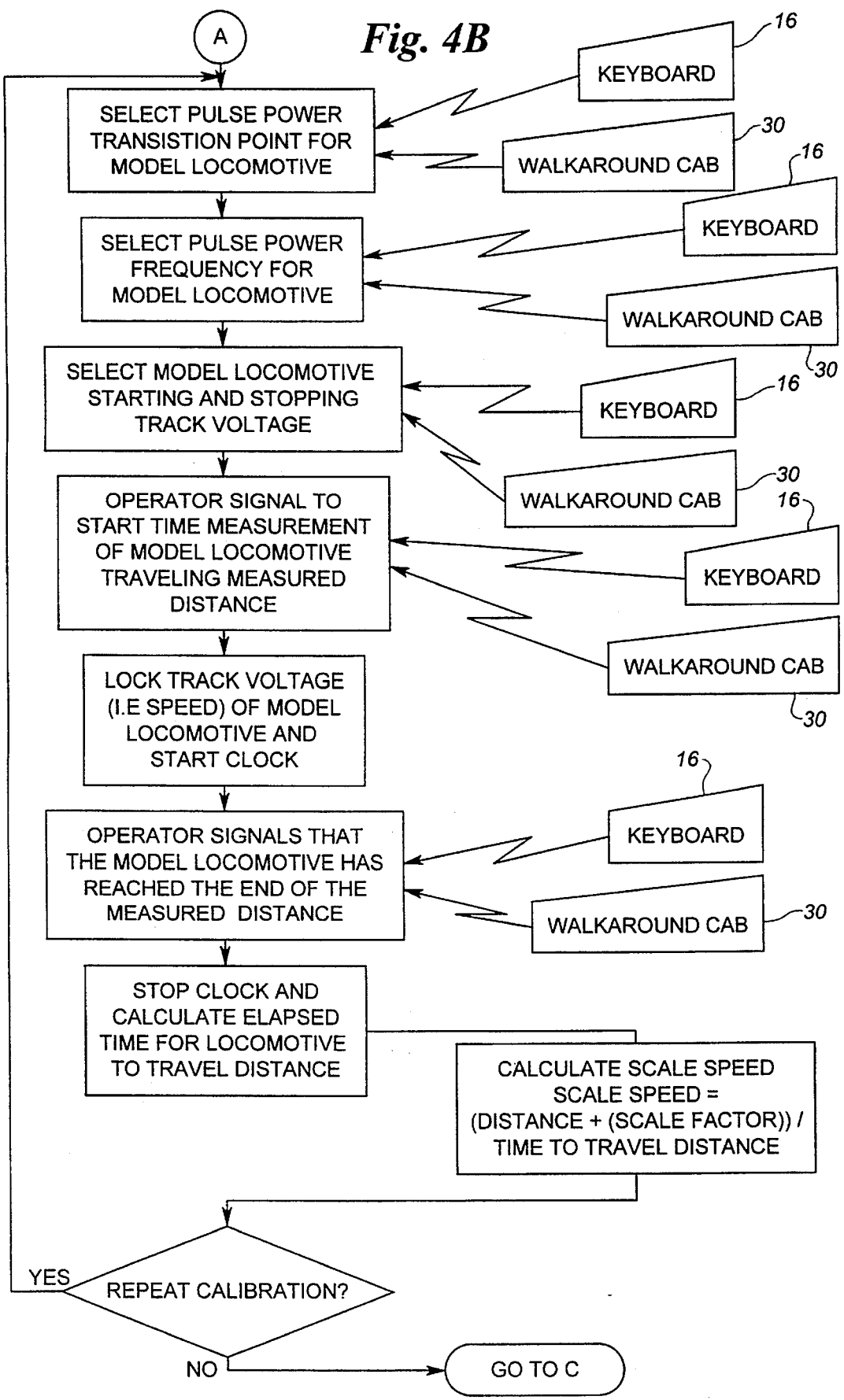

The process of calibrating model locomotive 10 is shown in FIGS. 4A to 4F. The operator enters the program through the selection of a menu item on computer display 14 via keyboard 16 as shown on the top of FIG. 4A and enters a unique name through keyboard 16 for model locomotive 10 or the locomotives that will be calibrated. The program prompts the operator to select a real or prototype locomotive or locomotives to be simulated by displaying a list of available locomotives on computer display 14. The program then retrieves a list of specifications on the selected locomotive from those stored on mass storage system 12 The operator is then asked to enter a measured distance of track via keyboard 16 which will be used to determine the operating characteristics of the motor in model locomotive 10. If a nominal or normal calibration is to be performed, the program branches to reference A in FIG. 4B. If a more complete or advanced calibration is to be performed, the program goes to reference B in FIG. 4E. If calibration is bypassed, the program returns to reference S FIG. 5A. FIG. 4B presents the operator with options controlling the AC and DC components of the voltage present to model track 22 which are selected from either keyboard 16 or walkaround cab 30. The starting and stopping voltage is measured by gradually increasing the voltage to model track 22 via either throttle control 214 on walkaround cab 30 or keyboard 16 and then indicating to the program the voltage level at which model locomotive 10 or locomotives begin to move and then again, by decreasing the voltage to determine the point where model locomotive 10 stops. A timed distance measurement is performed to determine the relationship of track voltage to scale speed for model locomotive 10. The operator is prompted to set locomotive 10 speed, indicate to computer 20 when locomotive 10 passes the start point. The program maintains a constant voltage on model track 22 and starts the clock until the operator indicates via keyboard 16 or walkaround cab 30 that the measured distance has been traveled. The program calculates the scale speed ss using the following formula:

$$ss = \frac{sf \times md}{et}$$

wherein:
sf=scale factor or ratio between model locomotive 10 size and real locomotive size md=measured distance et=elapsed time The scale speed and voltage value are temporarily saved for later use. The operator then has the option to repeat the process back to reference A or continue to reference C on FIG. 4C.

Figures 2, 4C:
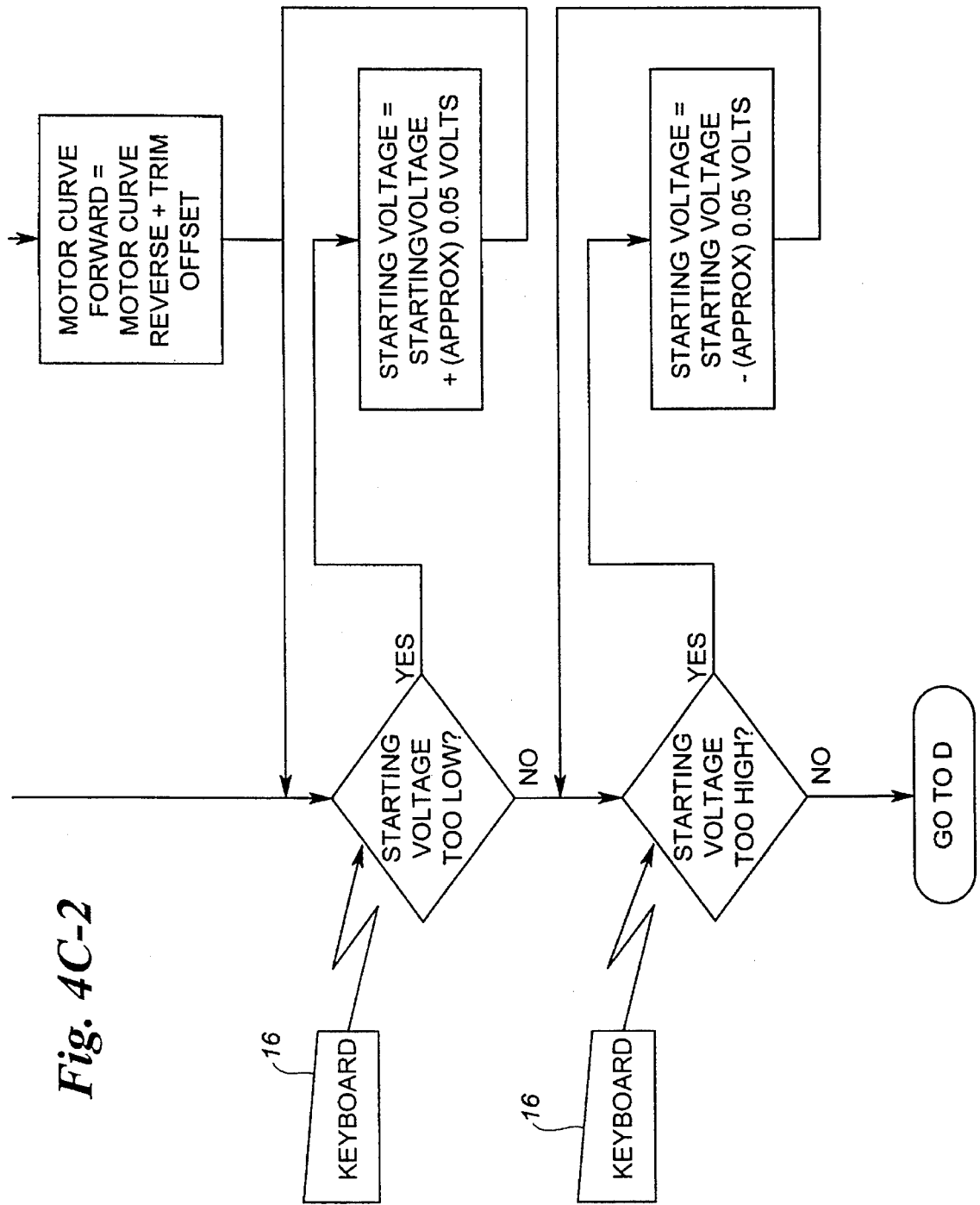
Figure 4D:
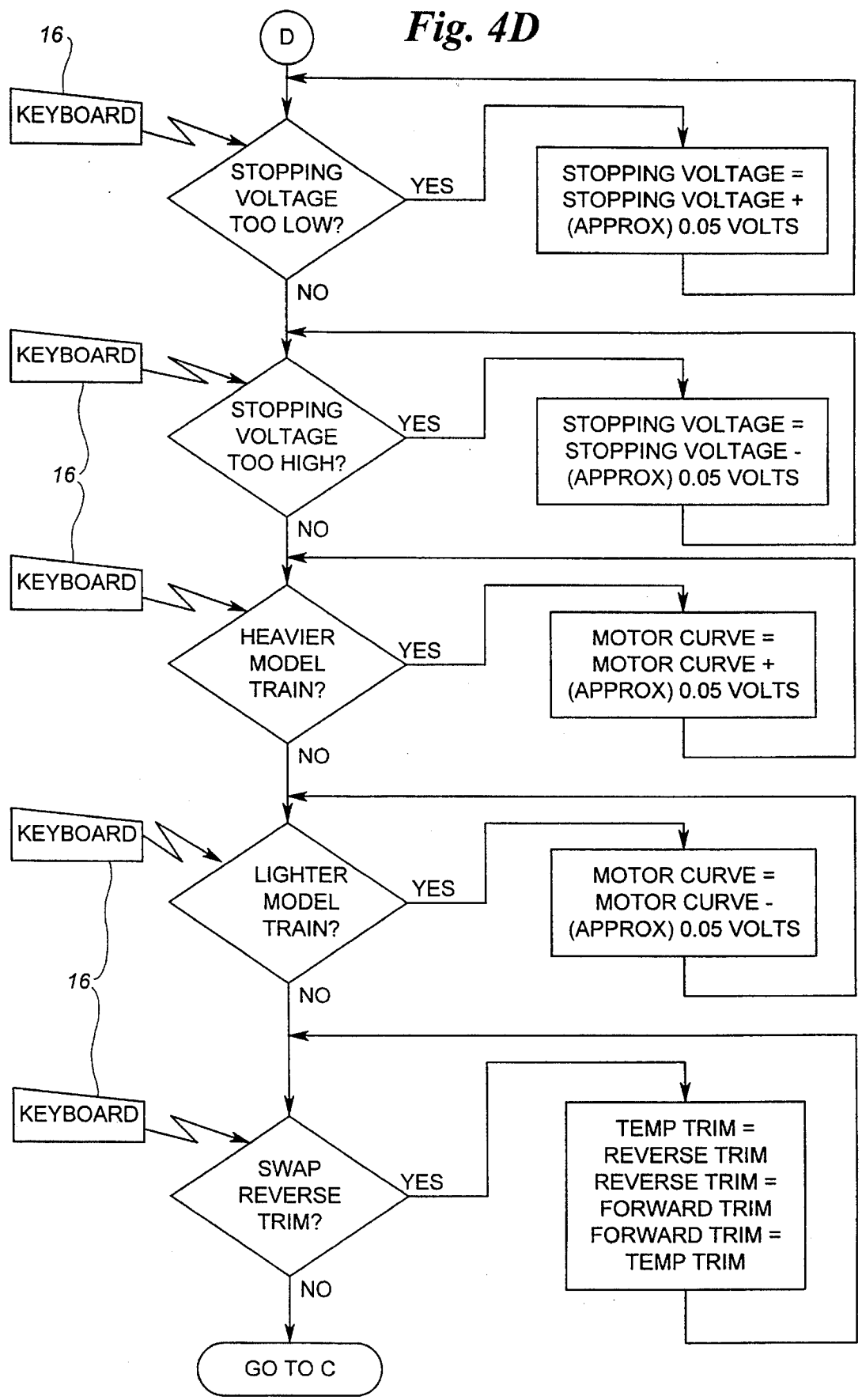

In FIG. 4C the operator has the option to adjust the calibration if it is not sufficient, or to enter a boost setting through keyboard 16 only. The calibration information is saved on mass storage system 12 for future use and the program returns to reference S in FIG. 5A. If the calibration requires adjustment, the program prompts the operator to adjust the motor reverse trim which compensates for operating differences between forward and reverse motion of locomotive 10 and to increase or decrease the starting voltage by approximately 0.05 volt increments through keyboard 16. The program then goes to reference D on FIG. 4D to allow the operator to adjust the calibration further. The operator is prompted to adjust the stopping voltage of locomotive 10 by up or down by an increment of approximately 0.05 volts. The program can loop on either of these adjustments until a satisfactory setting is obtained. The operator is then polled to adjust for a heavier or lighter model train. Even though the model cars are extremely light, they represent a load to the model. To compensate for this, the program will add this compensation to the calculated track voltage when controlling this model train. The program then asks the operator to if the reverse trim is to be swapped, if so the values for forward and reverse are exchanged and the program branches to reference C of FIG. 4C. If the calibration settings are satisfactory, the program presents an option to the operator readjust the calibration if necessary. The user can then adjust the kick percentage if desired, save the information as mentioned previously, and returns to reference S of main loop at the top of FIG. 5A.

Figure 4E:
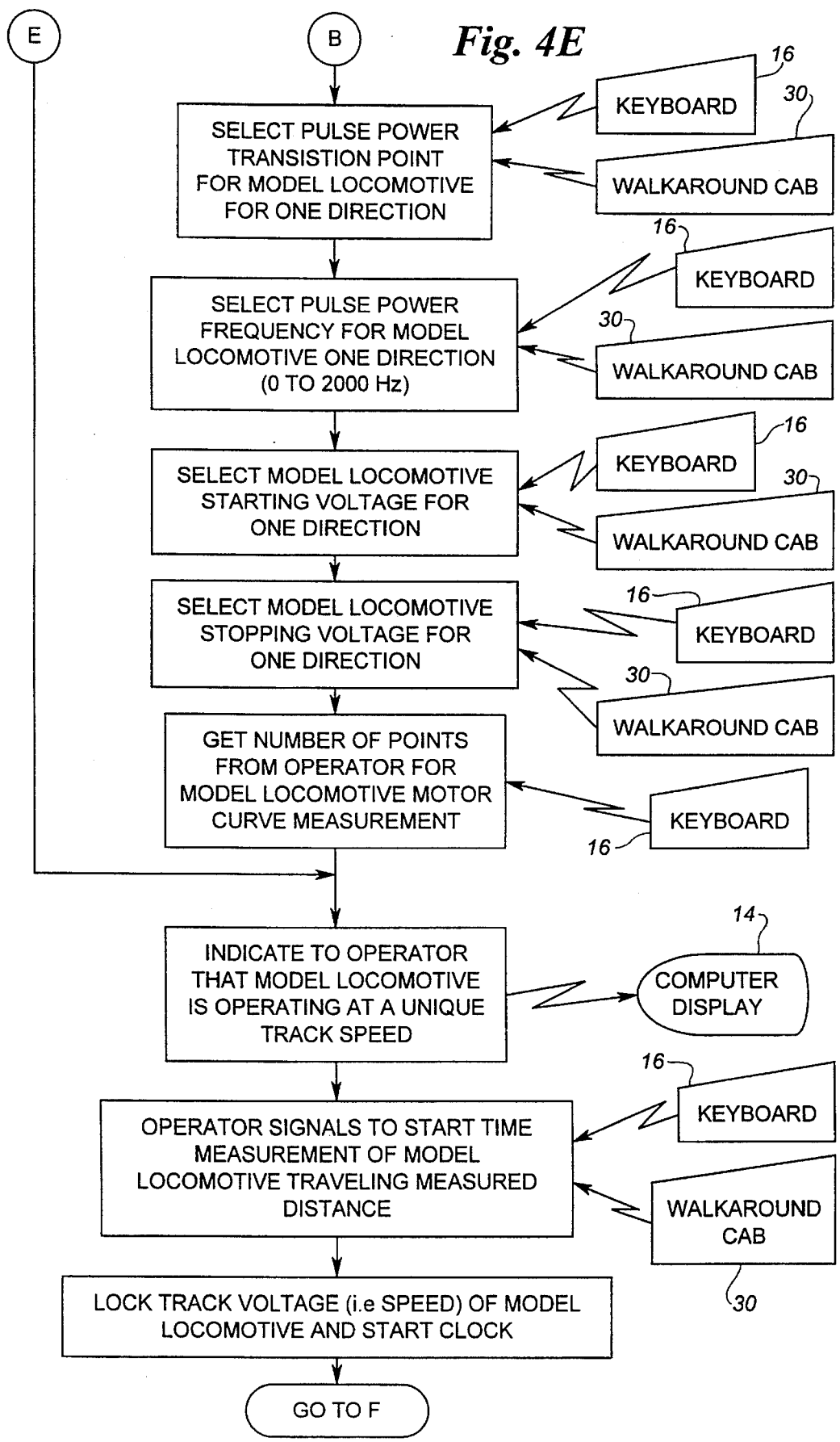
Figure 4F:
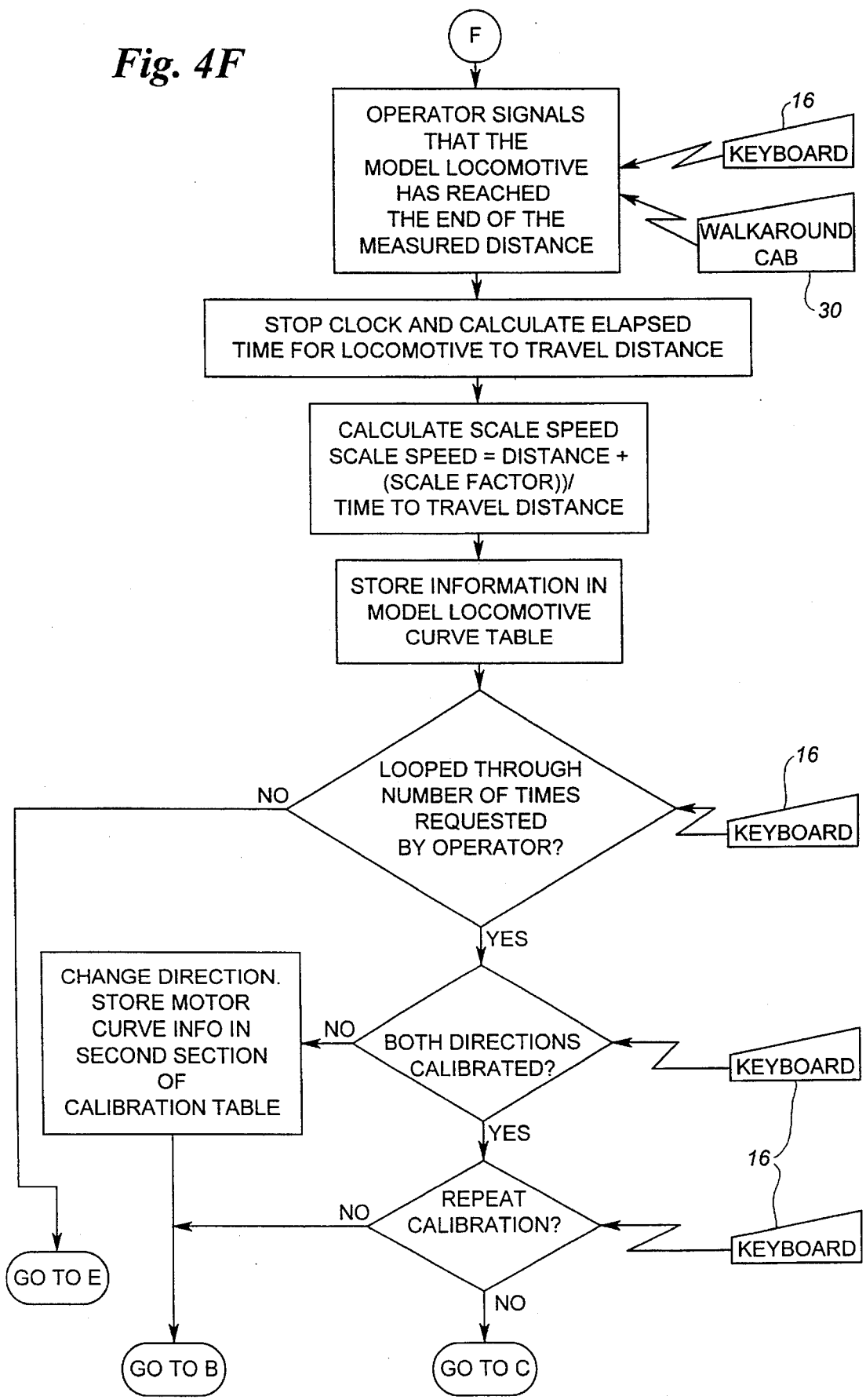

In FIG. 4A, if the operator chooses to perform an advanced calibration instead of a nominal calibration, the program will branch to reference B in FIG. 4E. The operator is prompted to select a pulse power transition point for one direction using walkaround cab 30 or keyboard 16. The operator then is asked to enter the pulse power frequency through walkaround cab 30 or keyboard 16 for the same direction. The operator then selects the starting and stopping voltage for the same direction in the same manner as in the normal calibration procedure. The operator is prompted to enter the number of points through keyboard 16 that will be used to create the motor response curve of model locomotive 10. The program outputs a message on computer display 14 indicating locomotive 10 is running at a unique speed. The operator then indicates through keyboard 16 or walkaround cab 30 when model locomotive 10 passes the starting point of the previously measured distance. The program begins a timer and maintains a constant voltage on model track 22 to prevent changes which would affect the accuracy. The program branches to reference F in FIG. 4F to continue the calibration process. When locomotive 10 passes the end of the measured distance, the operator again signals through walkaround cab 30 or keyboard 16 to the program to stop the timers and calculate the elapsed time. The program then calculates the scale speed using the same equation for normal calibration mentioned in the description of FIG. 4B. The results are temporarily stored in a table in the memory of computer 20 until the calibration process is complete. The program checks to see if the required number of speed points have been completed and branches back to reference E in FIG. 4E if they have not been completed. After the correct number of speed points have been checked, the program prompts the operator if both directions have been calibrated. The operator responds to the request through keyboard 16. If the response is negative, the direction of travel is reversed and the entire advanced calibration procedure is repeated for locomotive 10 operating in the opposite direction. If both directions are complete, the operator is offered the option to repeat the entire process by stating so via keyboard 16. If the response is yes, the entire process is repeated by branching to reference B in FIG. 4E. If the response is no, the program branches to reference C in FIG. 4C. In FIG. 4C the operator is then posed with the same prompt asking if the calibration needs adjusting that was described in the above normal calibration. If the operator requests an adjustment to the calibration, the program goes through the same series of events described in both FIG. 4C and FIG. 4D. If the calibration is satisfactory, the user is prompted to enter the kick or boost percentage through keyboard 16. The kick percentage provides a short increase in the voltage present on model track 22 to give locomotive 10 a temporary boost in the event of an intermittent contact between model track 22 and locomotive 10. After the kick percentage is entered, the calibration information is stored in mass storage system 12 and the calibration process is complete. The program then returns to the reference S at the top of FIG. 5A.

The main program flow shows how an operator would setup trains and simulate their operation. This flow is shown in FIGS. 5A–5F. The program begins by reading a configuration file stored in mass storage system 12 The configuration file contains information on user operational and interface preferences. The program then draws the initial setup 10 screen on computer display 14. The operator may then choose, using keyboard 16, to resume a session by selecting a menu item on computer display 14. If resume session is selected, information about previous operating session is read from mass storage system 12 The session information consists of the name and types of trains, locomotives and cars in use during the last operational session. The program interprets the session information and reads the necessary model characteristics from mass storage system 12. Model characteristics include the information learned about the model's motor during the calibration process. The program then reads the corresponding prototype information for the trains referenced in a previous session information from mass storage system 12. The prototype locomotive information is a list which contains historical information of the locomotive along with the physical characteristics such as weight and horsepower. Lastly, the number and type of train cars referenced in the session information are read from mass storage system 12. The car information contains historical information along with the physical characteristics such as weight and number of axles. If the operator does not wish to resume a previous session, the operator may choose to operate a previously calibrated model locomotive. This choice is made by selecting a menu option displayed on computer display 14 using keyboard 16. If a previously calibrated model is selected, the program reads this calibration and motor characteristics information from mass storage system 12. If the operator selects not to use a previously calibrated locomotive, the operator can select to calibrate a new locomotive model by choosing a menu option using keyboard 16. If the operator makes this selection, refer to the model calibration process in FIGS. 4A–4F. If calibration is not selected, the program branches to reference M in FIG. 5B where the program monitors other operator input from keyboard 16. The program will begin to loop for each train the operator has configured. The program ensures that all trains are updated for this time segment. If there are no trains to update, the program branches to reference O in FIG. 5F where the program refreshes computer display 14 with new train speed, acceleration, operator input information and warning indicators. The program clocks are then updated and displayed on computer display 14. The program returns to the top of the main loop reference S in FIG. 5A. This flow will continue until time equals a scheduled simulation update time for a train. When a scheduled time occurs, the program will branch as shown in FIG. 5B and will check for a throttle over temperature indication and for a short circuit on model track 22. If throttle circuit board 140 is over temperature or a short circuit on model track 22 is detected for this throttle, the program shuts off the power to model track 22, and schedules this train to be inactive for five seconds. The program branches to reference O in FIG. 5F, refreshing computer display 14 with speed, acceleration, operator input information, and warning indicators. If throttle circuit board 140 is not over safe operating temperature and a short circuit does not exist, the program checks if walkaround cab 30 is in use for this train. If walkaround cab 30 is in use, the program reads throttle control 214, brake control 212, sand switch 220, direction switch 218, and emergency stop switch 222. The program temporarily saves this information and interprets any operator input from keyboard 16. If walkaround cab 30 was not in use for this train, then the program simply interprets any operator input from keyboard 16 and continues at reference N in FIG. 5C. The program checks to see if the scheduled simulation update time has been reached for this train. If it has not, the program branches to reference O in FIG. 5F and updates computer display 14 with speed, acceleration, operator input information and warning indicators. If it is time to update the simulation for this train, the program calculates the throttle percentage tp from the operator throttle input. This is accomplished using the formula:

$$tp(t) = \left( \frac{tiv(t)}{mtiv} \right)$$

wherein:
t=the value of this scheduled simulation time
tiv=throttle input value from operator
mtiv=maximum throttle input value possible The program then calculates the horsepower output hpo for each real locomotive that would be produced using the formula:

$$hpo(n)(t)=(tp(t))^2 \times (((mhp(n)) \times can))-ihp(n))$$

wherein:
n=range from 1 to the number of real locomotives
t=the value of this scheduled simulation time
tp=throttle percentage
mhp=maximum horsepower output for real locomotive
ef=efficiency factor of real locomotive
ihp=idle horse power of real locomotive The program then calculates the brake percentage bp using the following formula:

$$bp(t) = \left( \frac{biv(t)}{mbiv} \right)$$

wherein:
t=the value of this scheduled simulation time
biv=throttle brake value from operator
mbiv=maximum brake input value possible The program uses the brake percentage to calculate the brake resistance br for this train. The brake resistance is calculate using the following formula:

$$br(t) = \sum_{n=1}^{n=\#ofcars} (wc(n) \times bf \times bp(t))$$

wherein:
t=the value of this scheduled simulation time
wc=weight of a real train car
bf=brake factor for conversion of brake percentage to brake resistance unit weight
bp=brake percentage The program calculates the total train resistance ttr of the real (or prototype) train (or consist) using the formula:

$$ttr(t) = br(t) +$$

$$\sum_{n=1}^{n=\#ofcars} ((cwf \times wc(n)) + (jrf \times na(n) \times ts(t-1)) +$$

-continued $$(arf \times sa(n) \times ts(t-1)^3)$$

wherein:
t=the value of this scheduled simulation time
br=brake resistance
cwf=car weight factor for converting weight of real train car to resistance
jrf=journal resistance factor
na=number of axles on real train car
arf=air resistance factor for convening real train car surface area to resistance
sa=surface area of real train
wc=weight of real train car
ts=train or track speed Program execution continues at P in FIG. 5D where it calculates the power or work pw being applied by each real locomotive using the formula:

$$pw(n)(t)=hpo(n)(t) \times pcf$$

wherein:
n=range from 1 to the number of real locomotives
t=the value of this scheduled simulation time
hpo=horsepower output of real locomotive
pcf=power conversion factor for converting horsepower to work The program calculates locomotive force lforce for each locomotive using the real locomotive power. This calculation uses the formula:

$$lforce(n)(t) = \left( \frac{pw(n)(t)}{ts(t-1)} \right)$$

wherein:
t=the value of this scheduled simulation time
n=range from 1 to the number of real locomotives
pw=power or work produce by real locomotive
ts=train or track speed The program then determines if the rail sanding was requested by the operator. If rail sanding was requested for this train, then the rail coefficient of friction rcf is calculated as follows:

$$rcf(t)=ncf+scf(t)$$

wherein:
t=the value of this scheduled simulation time
ncf=normal coefficient of friction for steel wheel on steel rail
scf=sand coefficient of friction adjustment for sand between steel wheel on steel rail Otherwise if the operator is not requesting rail sanding, the rail coefficient of friction rcf is:

$$rcf(t)=ncf$$

wherein:
t=the value of this scheduled simulation time
ncf=normal coefficient of friction for steel wheel on steel rail The program then calculates the maximum track force that can be applied without slipping the real locomotive driving wheels, mlforce. The program calculates this force for each locomotive for this train as follows:

$$mlforce(n)(t) = wdw(n) \times rcf(t)$$

wherein:

t=the value of this scheduled simulation time n=range from 1 to the number of real locomotives wdw=real locomotive weight on driving wheels rcf=rail coefficient of friction The program then determines if the real locomotive wheels would be slipping for each real locomotive, where n=1 to n=maximum number of real locomotives in this train. Program execution continues at reference Q in FIG. 5E. If the force produced by real locomotive lforce(n) exceeds the maximum track force mlforce(n), then the program warns the operator with a wheel slip warning on computer display 14 and on wheel slip indicator 210 of walkaround cab 30 if attached. The real locomotive force lforce(n) is set equal to zero. If the force the real locomotive is producing is less than the maximum track force mlforce(n) for this locomotive, then the real locomotive force lforce(n) remains unchanged. This process continues until all real locomotives have been analyzed for this train. The program then calculates the total train force ttf using the following formula:

$$ttf(t) = 0 - ttr(t) + \sum_{n=1}^{n=\#oflocomotives} lforce(n)(t)$$

wherein:

t=the value of this scheduled simulation time ttr=total real train resistance lforce=force applied by real locomotive The program now calculates the total train weight ttw using the following formula:

$$ttw = \sum_{n=1}^{n=\#oflocomotives} wl(n) + \sum_{n=1}^{n=\#ofcars} wc(n)$$

wherein:

wl=weight of real locomotive wc=weight of real train car

Figures 1, 5A:
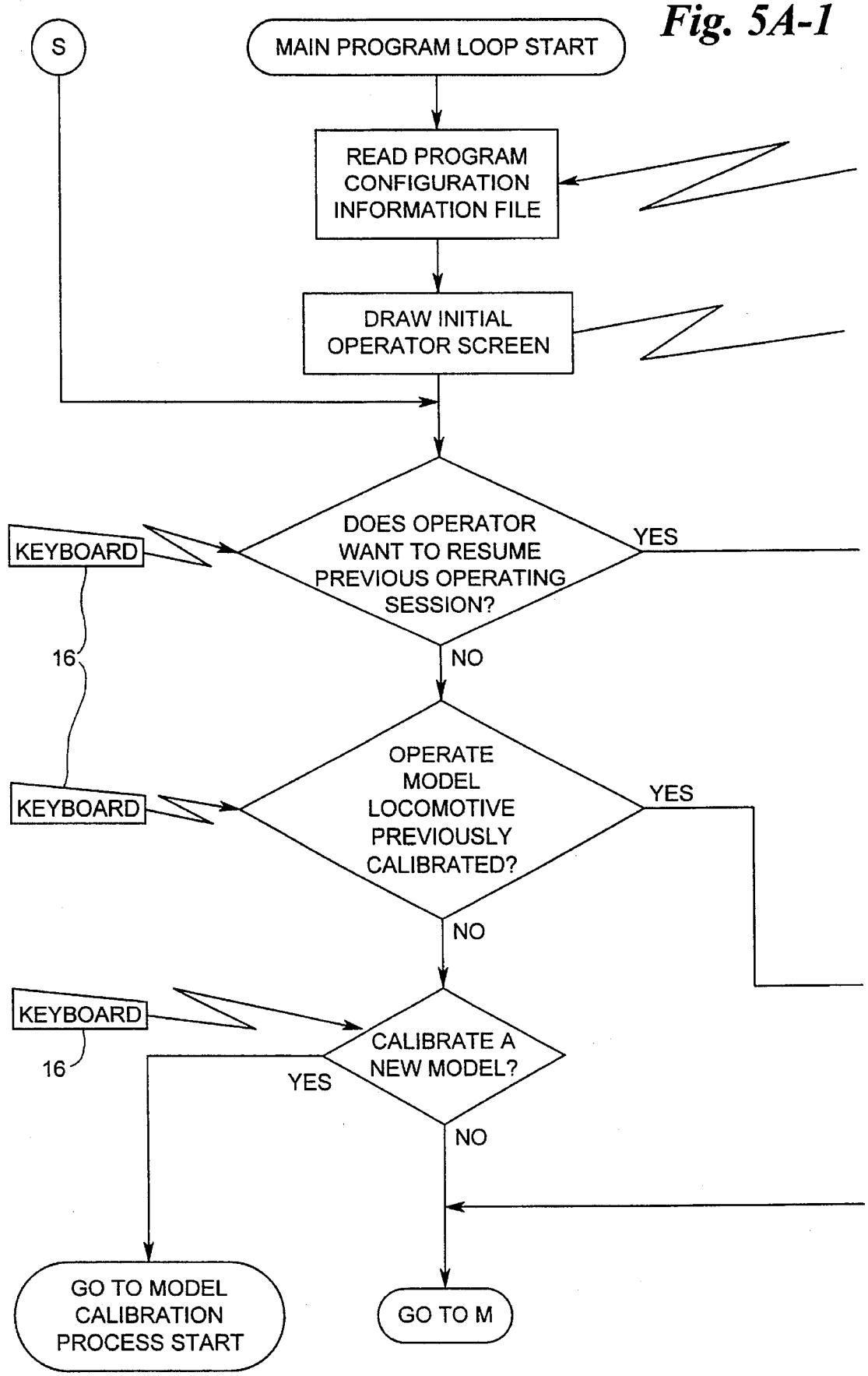
Figures 1, 5B:
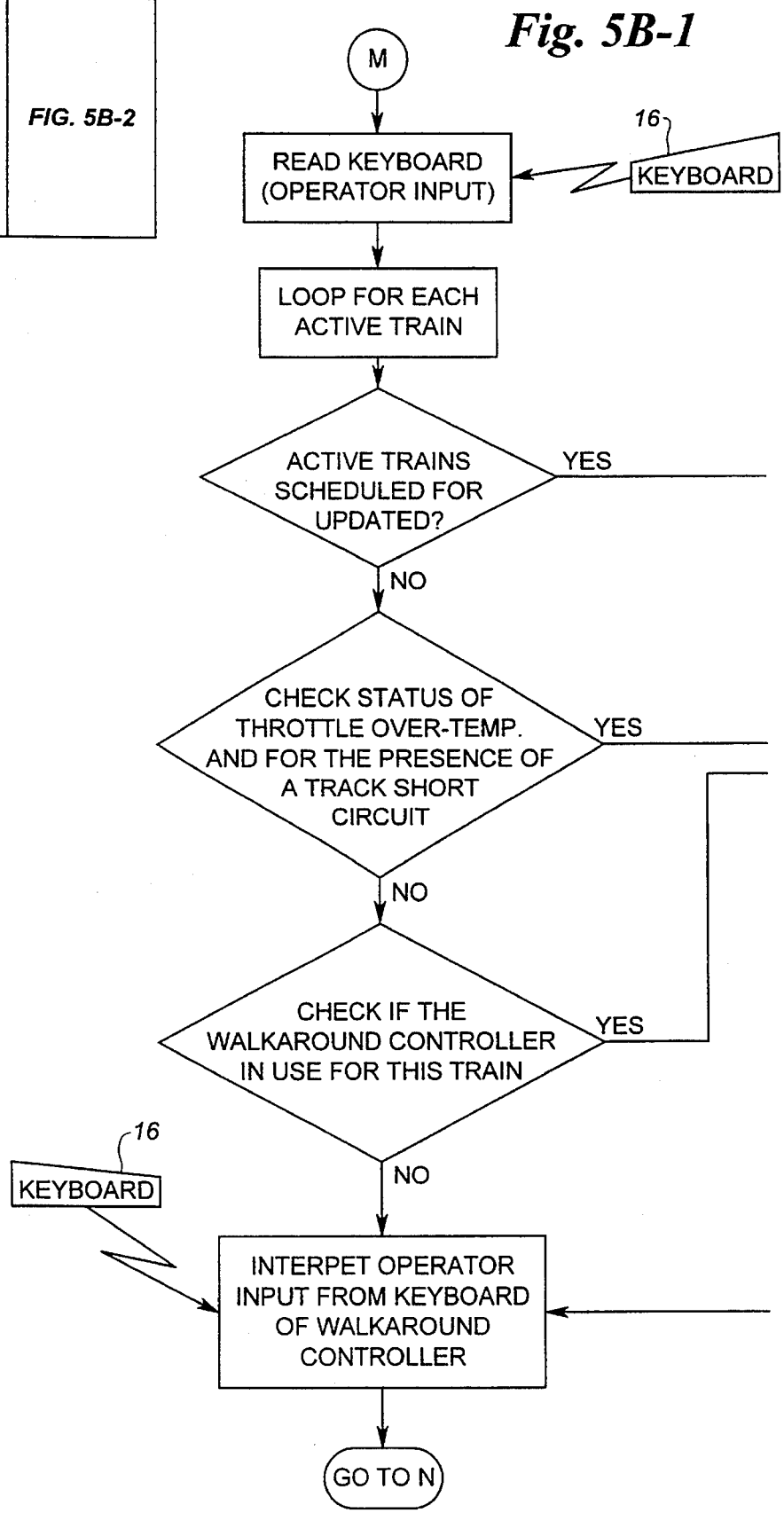
Figures 2, 5B:
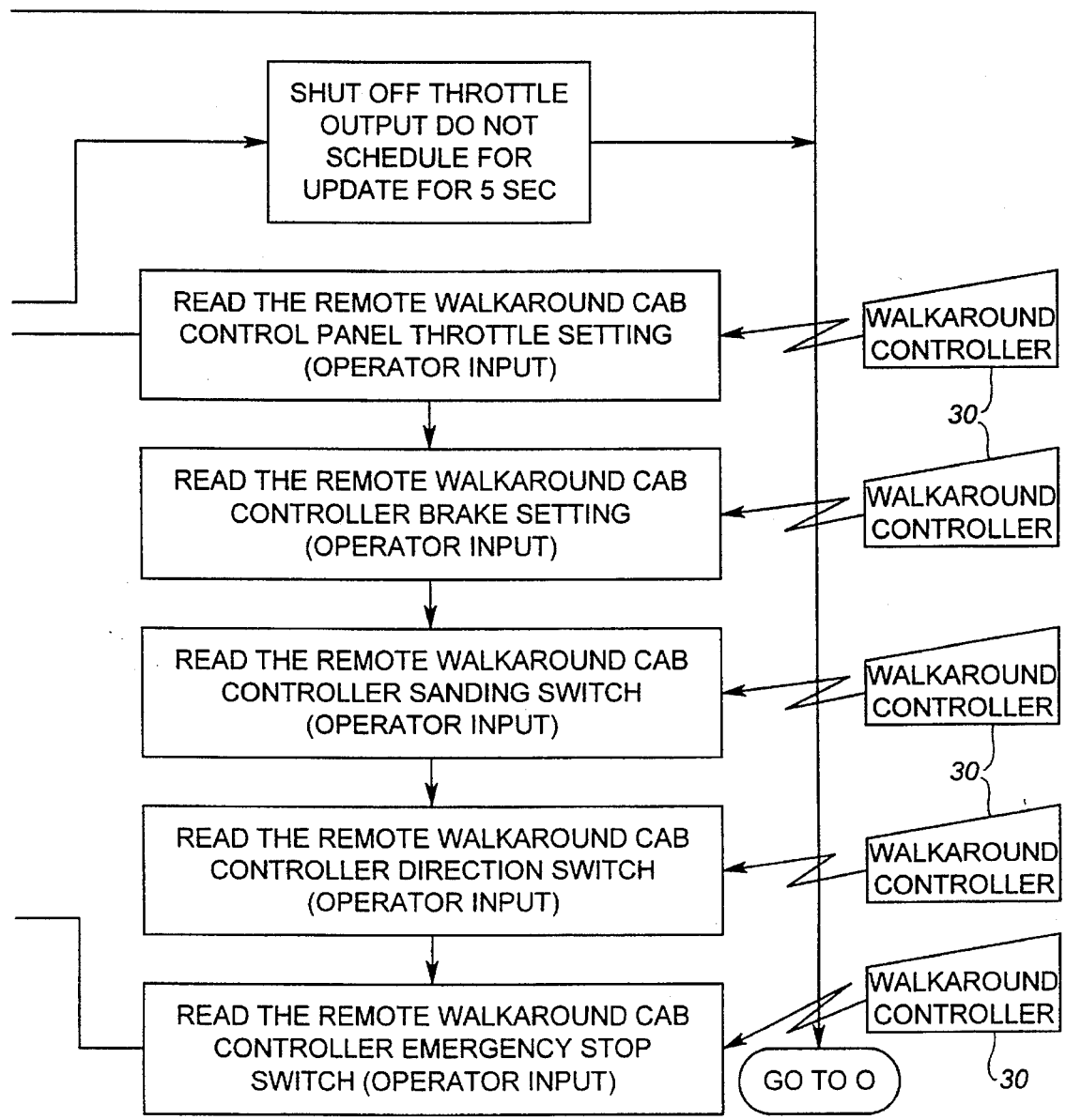
Figure 5C:
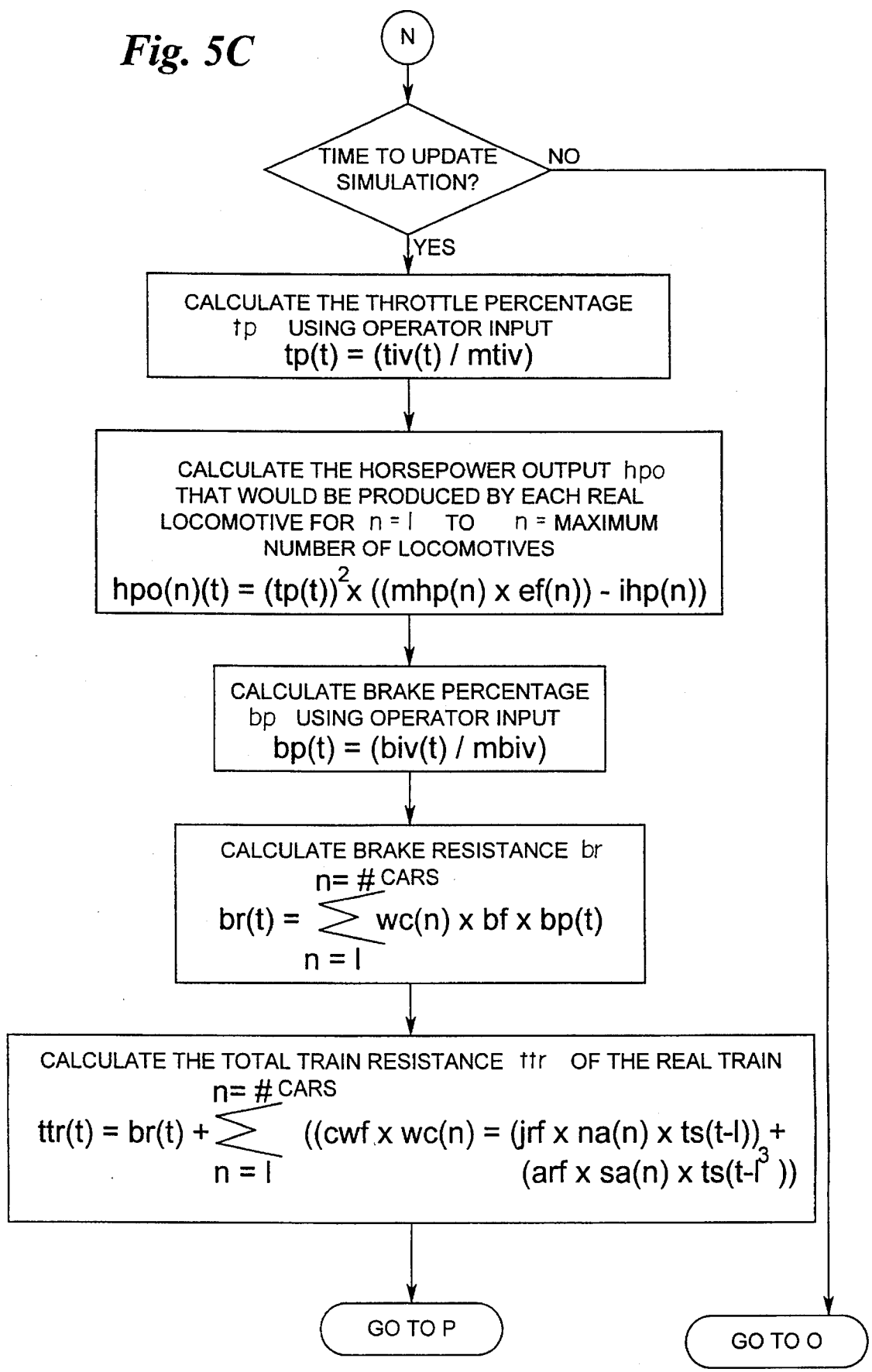
Figure 5E:
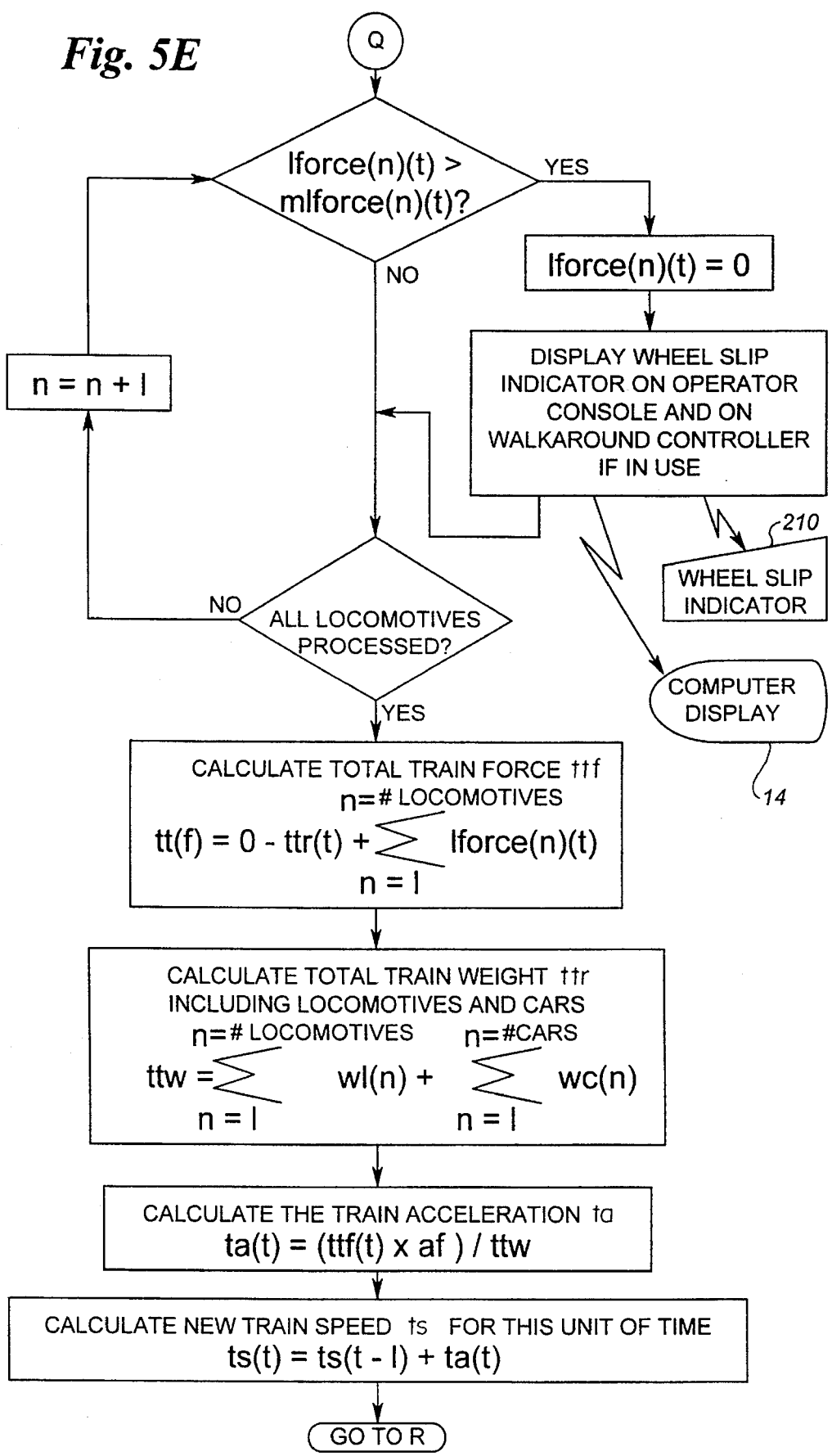
Figure 5F:
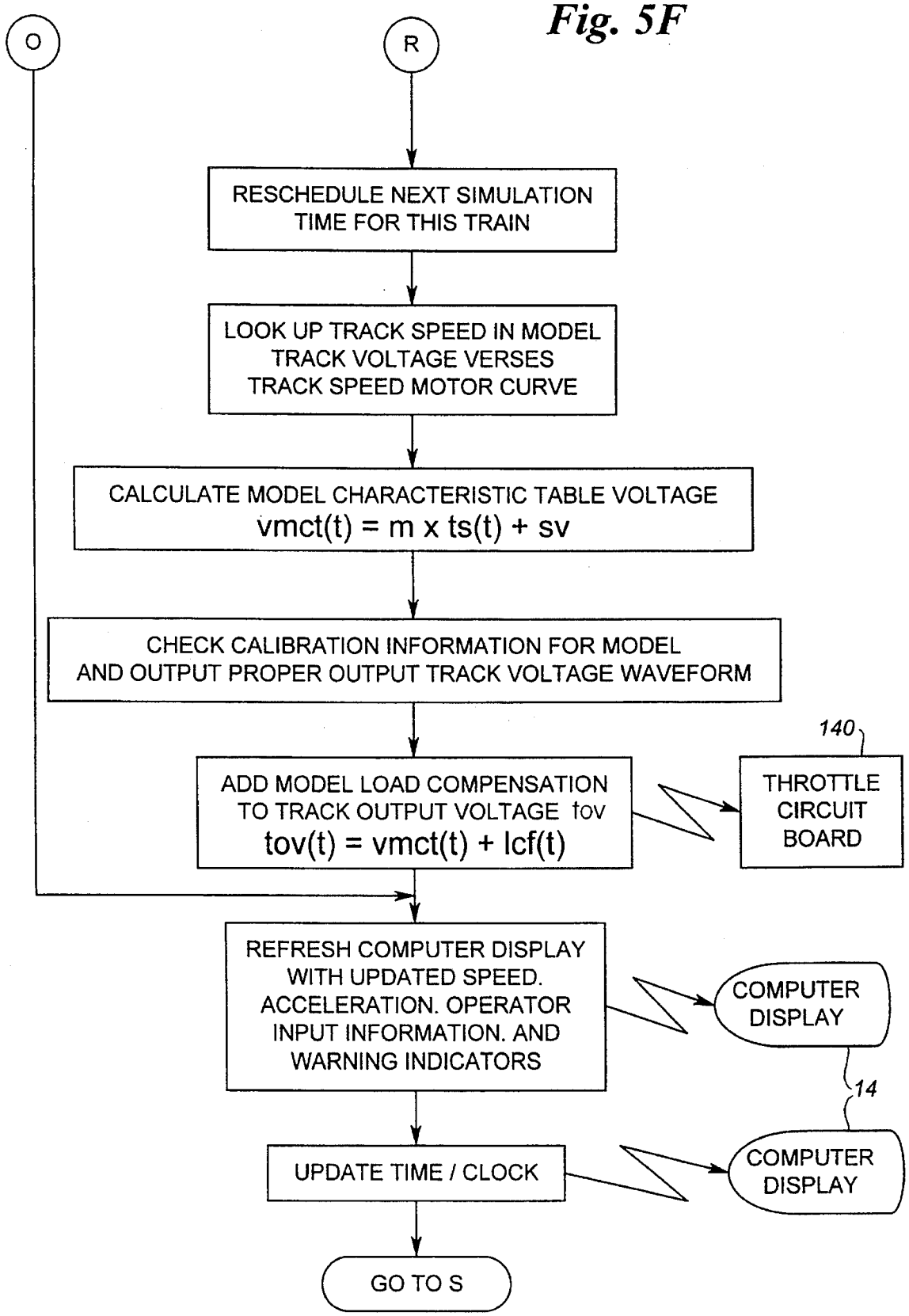

The train acceleration ta is then calculated using the formula:

$$ta(t) = \left( \frac{ttf(t) \times af}{ttw} \right)$$

wherein:

ttf=total force of real train af=acceleration factor to convert force per pound to acceleration ttw=total weight of real locomotives and real train cars The new track or train speed ts for this train in this unit of time is then calculated using:

$$ts(t) = ts(t-1) + ta(t)$$

wherein:

t=the value of this scheduled simulation time ta=train acceleration ts=train or track speed Program execution continues at reference R in FIG. 5F and the program schedules a new simulation update time for this train. The program uses the track speed as an index into the track voltage of the model vs. track speed motor table. The program calculated the ratio of volts to scale speed m using the formula:

$$m = \frac{(cv_x - cv_y)}{(cs_x - cs_y)}$$

wherein:

$cv_x$=calibration voltage for sample point x $cs_x$=calibrated scale speed for sample point x $cv_y$=calibration voltage for sample point y $cs_y$=calibrated scale speed for sample point y The values in the table are used to derive the proper voltage vmct for model track 22 to set model locomotive 10 at this track speed. The following formula is used in this calculation:

$$vmct(t) = (m \times ts(t)) + sv$$

wherein:

m=ratio of volts to scale speed ts=desired scale track speed of model locomotive 10 sv=starting voltage of model locomotive 10

The program determines if the operator has added model car load compensation for this train. If so, the program changes the track output voltage tov determined from the table as follows:

$$tov(t) = vmct(t) + lcf(t)$$

wherein:

t=the value of this scheduled simulation time vmct=calculated voltage from model motor characteristic table lcf=load compensation factor The program then checks the calibration information originally read from mass storage system 12 for the proper track voltage waveform at this track speed. The program refreshes computer display 14 with new train speed, acceleration, operator input information and warning indicators. The program clocks are then updated and displayed on computer display 14. The program returns to reference S at the top of the main loop in FIG. 5A.

OPERATION—FIGS. 1 To 5

A general description of the vehicle simulation system using scale models is provided to give the reader a better understanding of the more specific description of the invention which follows. Simply put, the invention allows the performance of a model vehicle to mimic or simulate the true operation of a real vehicle. The invention uses a computer executing a simulation and control program operating in conjunction with an interface circuit which has the capability to control the speed and direction of a model vehicle.

In a preferred embodiment, model locomotive 10 is used to simulate the operation of a real train and is controlled by throttle circuit board 140 which is installed in computer 20 and resides electrically between power supply 26 and model track 22. Computer 20 executes a simulation program which is capable of determining, through the solving of a series of calculations, the track speed of a real train at a given point in time. An operator supplies information about the real train, including the number and types of cars, the car weights, environmental conditions, operator controls settings, and the number and types of real locomotives being simulated. Prior to running a train, the operator performs a calibration of model locomotive 10 to determine the power level at which the it begins to move; the power level at which it ceases to move; the scale or ratio between the model train and the real train being simulated; and the relationship between power level applied to the motor and the effective scale speed of model locomotive 10 At predefined intervals, the program uses the above parameters to determine, through simulation of the real train, what the speed of the train should be and sets the scale speed of model train to match that determined by the program. Scale speed refers to the relationship between the size of a model and the actual vehicle and the speed the model is traveling. If the model is half the size of the real vehicle and going half as fast, the model would be traveling at the same scale speed. As the operator changes the brake, throttle and sand switch control settings through keyboard 16 or walkaround cab 30 the program takes the new settings and updates the train speed. Feedback to the operator is provided by indicating the train speed, acceleration, wheel slip status, relative time, and train control settings on computer display 14 or by illuminating wheel slip indicator 210 of walkaround cab 30 if necessary. Using the aforementioned parameters, the program determines train speed, acceleration, elapsed time and distance traveled by performing a series of calculations which accurately model the physical dynamics of a real train. Control of the speed of the model train is accomplished by setting the voltage present at the motor to properly adjust the speed of the model to match the calculated speed of the real train.

In a preferred embodiment, throttle circuit board 140 (FIG. 2) is installed via expansion bus 112 in computer 20. Power supply 26 is connected to throttle circuit board 140 and provides a DC power source for model track 22 and model locomotive 10. The voltage to model track 22 is controlled by throttle circuit board 140 via computer 20 and the simulation and control program. Computer 20 has access to all functions of throttle circuit board 140 through expansion bus interface 120. Computer 20 monitors the analog voltage levels of power supply 26, model track 22, and brake control 212 and throttle control 214 of walkaround cab 30 by reading values from analog to digital converter 124. Digital inputs, are monitored by computer 20 through digital input/output logic 126. These digital inputs consist of walkaround cab 30 connect status as well as direction switch 218, sand switch 220, and emergency switch 222 settings. Computer 20 controls digital outputs which are used to activate wheel slip indicator 216 of walkaround cab 30 and output polarity control circuit 132. Voltage to model track 22 is controlled by computer 20 by writing a value to digital to analog converter 124 which is driven to model track 22 through output amplifier 130. Output amplifier 130 maintains a constant voltage level under the control of digital to analog converter 124 while it supplies current on demand to model track 22. If configured to do so by computer 20, output pulse generator 122 modulates the output of digital to analog converter 124. Output pulse generator 122 is a digital counter/timer circuit which accepts values from computer 20 and enables the output of digital to analog converter 124 to vary between zero and the value set by computer 20. Output amplifier 130 includes a temperature sensor which is monitored by computer 20 by reading values from analog to digital converter 124.

In a preferred embodiment, model performance characteristics are obtained by performing a calibrations process on model locomotive 10. The operator works interactively with the program to determine a set of performance parameters for model locomotive 10 required by the simulation and control program being run by computer 20. At first the operator enters a label which is used to identify the set of model characteristics currently being gathered. The operator then selects a real locomotive for model locomotive 10 to simulate from a listing contained in the program. The selection could be a single real locomotive or several real locomotives operating in tandem often referred to as operating as a multi-unit. Computer 20 then reads the specifications for the selected real locomotive from mass storage system 12 and prompts the operator to enter a scale factor or ratio between model locomotive 10 and a life size or real locomotive. Selection could be in a standard model railroad scale such as G, O, HO, N, Z, or could be defined by the operator as a ratio. A length of model track 22 is measured and the value is entered into computer 20 through keyboard 16 in either inches or centimeters.

The operator is then presented with the option of selecting either of two different levels of calibration. The first level of calibration is used to determine a minimum set of model performance parameters while the second level performs a more in-depth calibration to extract more information about the performance of model locomotive 10 If a normal calibration is selected, the operator is first prompted to set the transition point for pulse power. Pulse power is a term for combining both Direct Current and Alternating Current voltages to enable a DC motor in a model to operate smoothly at low speeds. Experimentation has shown that small DC motors operate better at low speeds when the source voltage is pulsed from zero to some point where the motor runs smooth. Most small DC motors run smoothly from this point up to the maximum speed of the motor. The pulse power transition point is where the track voltage changes from a pulsing DC voltage level to a stable DC voltage. Once set, computer 20 prompts the operator to enter a frequency or rate at which the voltage will pulse. Since the operational characteristics of DC motors vary greatly, the optimum value of this frequency will change from model to model. The operator enters the frequency at which the model appears to operate best. Next, computer 20 prompts the operator to determine the voltage level at which model locomotive 10 begins to move and the voltage level at which it ceases moving. The operator increases the voltage present to the motor in model locomotive 10 until it begins to move. The level is temporarily saved by the program and the operator is prompted to reduce the speed of model locomotive 10 until it stops moving. The operator indicates to computer 20 that model locomotive 10 has stopped through keyboard 16 or walkaround cab 30 and is temporarily saved by the program.

In a preferred embodiment, the relationship between the voltage level applied to the motor and the resultant scale speed of model locomotive 10 is critical. The operator is instructed to start model locomotive 10 in motion and signal to computer 20 that the beginning of the previously measured distance of track has been crossed. The track voltage level is locked by computer 20 until the operator signals through keyboard 16 or walkaround cab 30 that the end of the pre measured distance has been reached. This time trial provides the program with a critical parameter relating to the scale speed of model locomotive 10 at a given voltage. Computer 20 calculates the scale speed ss using the formula:

$$ss = \frac{sf \times md}{et}$$

wherein:
sf=scale factor or ratio between model locomotive 10 size and real locomotive size
md=measured distance
et=elapsed time The scale speed and the corresponding voltage is temporarily saved in a table for later use. If the operator feels the calibration process is inadequate, it can be repeated. If the calibration needs adjustment the operator indicates so to computer 20 and is offered the option to adjust the reverse trim through keyboard 16 to compensate for differences between forward and reverse operation of model locomotive 10 If the starting voltage temporarily saved is too low, it can be increased by indicating as such to computer 20 which will increase the value by approximately 0.05 volts. The operator can repeat the process until the starting voltage is satisfactory. A similar adjustment process is provided to decrease the starting voltage in the event that it is too high. The temporarily saved starting voltage value is decreased by approximately 0.05 volts as many times as is required to produce a correct level. The stopping voltage can be adjusted upwards or downwards by increments of 0.05 volts if the initial calibration levels are incorrect. The operator also has the option to adjust for a heavier or lighter model train. If model locomotive 10 is hauling many cars, the additional weight can be compensated for by increasing all temporarily saved voltage values by a factor of 0.05 volts. If model locomotive 10 is hauling fewer cars, the decrease in weight can be compensated for accordingly by reducing all temporarily saved voltage values by a factor of 0.05 volts. Each step can be repeated until model train loads are compensated for in a satisfactory manner. The operator is then asked if the reverse trim is to be swapped. If so, computer 20 exchanges the forward and reverse trim voltage values and the operator is prompted on whether to repeat the adjustment process or not. If the response is negative, the operator is asked to enter a kick or boost percentage. This value, entered via keyboard 16, is used to provide an electric nudge which temporarily increases the track voltage by the specified percentage to start a sluggish, dirty or worn out model motor or alleviate an intermittent contact between model locomotive 10 and model track 22. These voltage levels along with the temporarily stored voltage level values and their corresponding information and are stored in a suitable memory such as mass storage system 12. Computer 20 returns to the main program loop through reference S shown at the top of FIG. 5A.

The second form of calibration is a more advanced process whereby more information about model locomotive 10 is obtained. A more accurate motor response curve for model locomotive 10 is derived by collecting more samples of the scale speed at more voltage points. The process also entails determining the starting and stopping voltages for model locomotive 10 in each direction and the optimum pulse power transition point and frequency for each direction. The process of determining starting and stopping voltages as well as pulse power transition point and pulse frequency as previously discussed in the nominal calibration process is repeated for both directions in the advanced calibration process. The values obtained are saved temporarily until the process is complete. The operator is prompted to enter the number of model locomotive 10 scale speed sample points through keyboard 16. Computer 20 indicates to the operator through computer display 14 that model locomotive 10 is operating at a set track speed. The operator indicates when model locomotive 10 has passed the beginning of the measured distance. Computer 20 locks the track voltage and stars a timer routine. The operator signals when the end of the measured distance has been reached through keyboard 16 or walkaround cab 30. The scale speed ss is calculated using the same formula described in the nominal calibration routine:

$$ss = \frac{sf \times md}{et}$$

wherein:
sf=scale factor or ratio between model locomotive 10 size and real locomotive size
md=measured distance
et=elapsed time The scale speed value and the corresponding voltage value are temporarily saved. The operator is then prompted to either repeat the process and sample additional voltage versus scale speed points or continue on. If calibration in both directions is complete, the operator has the option to repeat the calibration process or return to the main program loop. If both directions of the calibration are not complete, computer 20 changes the direction of travel for model locomotive 10 and returns to reference B in FIG. 4E to prompt the operator for pulse power transition point, pulse power frequency, starting voltage, and stopping voltage. The operator is then asked to supply the number of scale speed sample points for this direction. Computer 20 then repeats the previously described process of collecting the information through interaction with the operator to the determine the relationship of voltage to scale speed of model locomotive 10 The program loops through the routine as many times as the operator has specified. Once complete, the operator can repeat the entire calibration or branch to reference C on FIG. 4C. As previously discussed, the operator is presented with the option to adjust the calibration if it is unsatisfactory or set a kick or boost percentage through keyboard 16. The results of both calibration procedures are saved in a table which reflect the response of the motor in model locomotive 10. The nominal calibration procedure yields a starting voltage, a stopping voltage, a particular scale speed value at a particular voltage as well as pulse power settings. The more advanced calibration process provides a user defined number of scale speed sample points and their corresponding voltage levels as well as starting voltages, stopping voltages, and pulse power settings for each direction. The calibration information is saved in mass storage system 12 and the program returns to the main program loop at reference S at the top of FIG. 5A.

The main loop and simulation flow of a preferred embodiment loads data pertaining to operator preferences, model motor performance characteristics, real locomotive performance characteristics, and real railroad car characteristics. It should be understood that all data, such as data relating to real vehicle to be simulated, data relating to the model vehicle, or data relating to the operator interface, is stored in one or more databases 13 (seen in FIG. 1B) stored on mass storage system 12. Multiple different real trains can be simulated simultaneously, each is set up in a unique operator control window. Model control is then performed by calculating the sum of the forces on a real train that the operator has configured in a operator control window. Forces present on real trains come from various sources, some of which are operator controls settings such as, throttle, brake, sand switch, train resistance forces such as, real train car journal resistance, real train car weight resistance, real train car wind resistance, and locomotive forces such as, power real locomotives are producing, real locomotive weight, etc. The force on the train is converted to an acceleration rate, (either positive or negative), and a new speed and track voltage compatible with a model locomotive being controlled. Model motor performance characteristics are acquired by computer 20 when models are calibrated. Computer 20 then uses a linear interpolation technique to determine a track voltage from a model motor performance table.

Referring now to FIG. 5A, information about the previous state of the program is supplied to computer 20 from a suitable memory device such as mass storage system 12. The information supplied to computer 20 includes information on such items as the units of measure, English or metric, the color or intensity for items displayed on computer display 14, and other previous operator interface information. Computer 20 then determines the number and type of model interfaces in use and draws the initial operate screen on computer display 14. This screen contains the appropriate number of operator control windows. The number of operator control windows directly corresponds to the number of models that can be simultaneously controlled. In a preferred embodiment, each operator control window contains bar graphs for the throttle and brake controls, numeric displays of scale speed and scale acceleration, warning indicators for wheel slip, track short circuits, model interface over-temperature, and information on prototype (or simulated) train weight, direction, calibrated model in use, unique name provided by the operator, and operator input source. The operator input source can either be keyboard 16 or walkaround cab 30. Computer 20 draws a menu on computer display 14 in an area that does not contain an operator window.

In a preferred embodiment, menus are used to query the operator about alternate functions or operations which computer 20 can perform. Computer 20 now draws menus that contain selections to resume a previous operation session, operate a model that was previously calibrated, or calibrate a new model. The operator selects choices from the menus using a suitable input device such as keyboard 16. If the operator chooses to resume operation of a previous session, computer 20 retrieves data on the consists (or train), real (or prototype) locomotive specifications for those included in the consists, real (or prototype) car specification information for cars included in the consist, and calibration information on the model locomotives to be used. This information can be supplied to computer 20 from any suitable data storage medium such as mass storage system 12.

In a preferred embodiment the session data includes the number and types of prototype cars in the consists, the number and types of prototype locomotives in the consists, the number and type of model locomotives, and the operator display window that was used to control this model during the last operating session. The information supplied to computer 20 for each prototype locomotive includes the manufacturer, year first produced, model number, weight, weight on drive wheels, wheel diameter, number of driving wheels, number of non driving wheels, power plant type, manufacturer's rated maximum horsepower, idle horsepower, horsepower efficiency rating, maximum drawbar force which can be applied, type of fuel, fuel capacity, and revision number of information. The information supplied to computer 20 for each prototype car includes the weight of the car, number of axles, length or volume of the car, and name or model number. The information supplied to computer 20 for model locomotive 10 characteristics includes model starting voltage, stopping voltage, pulse power transition voltage, pulse power frequency, kick voltage, model load compensation, and scale speed verses track voltage table.

The operator can select to use a previously calibrated model. If this selection is made computer 20 is supplied information from suitable data storage medium such as mass storage system 12 on model locomotive operating characteristics as discussed previously. The operator select to calibrate a new model. If this selection is made the program branches to the Model Calibration Process Start in FIG. 4A. Otherwise, computer 20 continues execution on FIG. 5B at reference M. If any cab operator windows are configure to operate models, computer 20 begins a process of monitoring operator input from any suitable input devices such as keyboard 16 and/or walkaround cab 30, and updates computer display 14 and suitable model interface such as throttle circuit board 140. For computer 20 to provide accurate and simultaneous simulation of multiple models, it determines which operator input windows and corresponding models require updating based on the time that they were last updated and the frequency that the item should be updated.

In a preferred embodiment, if an active operator control window and corresponding model train are scheduled for simulation update, computer 20 begins execution of the simulation and control loop for this model. Computer 20 determines it should process this loop, if the elapsed time since the last simulation update time for this model is greater than or equal to the scheduled elapsed time. Now computer 20 interrogates throttle circuit board 140 to determine if it is over-temperature or if a track short circuit condition exists. If either of these conditions exist, computer 20 sets the model output track voltage to zero volts, displays the appropriate warning indicator within the operator control window on computer display 14 and does not reschedule another update, of this train for approximately five seconds. If an over-temperature or track short circuit condition occurs computer 20 continues execution at reference O of FIG. 5F. If track short circuit and model interface over-temperature conditions do not exist, computer 20 determines if walkaround cab 30 is the active input device for this cab. If the operator has selected input to be furnished by walkaround cab 30 and walkaround cab 30 is physically connected to throttle circuit board 140 then computer 20 will retrieve input data from walkaround cab 30. In a preferred embodiment, computer 20 would branch if the previous condition were true and obtain input data from walkaround cab 30. This data includes the setting of throttle control 214, brake control 212, sand switch 220, direction switch 218, and emergency stop switch 222.

If the previous conditions to obtain input from walkaround cab 30 was not met, computer 20 would obtain this information from keyboard 16. If the emergency stop is indicated either through input supplied by walkaround cab 30 or keyboard 16, the voltage on model track 22 is set to zero, stopping model locomotive 10. Computer 20 resets the internal state of throttle control 214 to throttle off, and the brake control 212 to full on. This operator window would not be scheduled for update again until the operator acknowledged the emergency stop condition. The model controlled by this operator window would not operate until the emergency stop was acknowledged, however, the operation of other models by the system would not be affected.

If the operator does not input the emergency stop condition computer 20 continues execution for this model at FIG. 5C reference N. If the elapsed time since the last simulation update for this model is equal to or greater than the elapsed time set by computer 20 at the last execution of this process then computer 20 will reprocess the simulation and model control process, for this model. If this is the first test of the simulation time the elapsed time is initialized to cause execution of the loop. If the elapsed time is not greater than the elapsed time stored to perform the next simulation pass computer 20 continues execution for model and operator control window at FIG. 5F reference O.

If computer 20 determines, through evaluation the previous condition simulation elapsed time condition, to execute the simulation and model control process computer 20 calculates the throttle percentage tp using the following equation:

$$tp(t) = \left( \frac{tiv(t)}{mtiv} \right)$$

wherein:
t=the value of this scheduled simulation time
tiv=throttle control input value from operator
mtiv=maximum throttle control value It should be noted that the throttle percentage tp has a range of 0 to 1. Some equation variables within this section are time dependent. These variables contain the reference t. This indicates that this variable is a time dependent variable and is recalculated at each scheduled simulation interval. In a preferred embodiment the interval of time selected is approximately 0.25 seconds. It is important to note that the time dependent constants that are used in the equations could be modified along with the scheduled unit of simulation time to derive similar results as long as the time unit t and the time dependent constants were adjusted appropriately. Computer 20 then calculates the horsepower output that would be produced by each real locomotive on the consists. The horsepower output ho is calculated using a nonlinear equation to more accurately simulate the horsepower output characteristic of the prototype power plant. The horsepower output hpo for each prototype locomotive in the simulated consist is calculated using:

$$hpo(n)(t) = (tp(t))^2 \times ((mhp(n) \times ef(n)) - ihp(n))$$

wherein:
t the value of this scheduled simulation time
n=range from 1 to the number of real locomotives
tp=throttle percentage
mhp=the maximum rated horsepower output of real locomotive
ef=the efficiency factor of the power transmission medium for real locomotive
ihp=the idle horsepower output of real locomotive The maximum rated horsepower mhp, idle horsepower ihp, and transmission medium efficiency factor ef are some of the real locomotive performance information supplied from mass storage system 12. The horsepower output ho varies with operator input as it is dependent on throttle percentage tp which was calculated previously.

Computer 20 now calculates the brake percentage bp using operator input and the following formula:

$$bp(t) = \left( \frac{biv(t)}{mbiv} \right)$$

wherein:
t=the value of this scheduled simulation time
biv=brake control input value from operator
mtiv=maximum brake control value It should be noted that the brake percentage bp has a range of 0 to 1. The brake percentage is a nonlinear response calculated from operator brake input. Computer 20 uses the brake percentage bp to calculate the brake resistance force br of the real train. Real trains have brakes on each train car. The following formula is used for this calculation:

$$br(t) = \sum_{n=1}^{n=\#ofcars} (wc(n) \times bf \times bp(t))$$

wherein:
t=the value of this scheduled simulation time
wc=weight of a real train car
bf=brake factor for conversion of brake percentage to brake resistance unit weight.
bp=brake percentage It should be noted that the weight of a real train car and the brake factor for a real train car can be lumped together into a single brake resistance factor a real train car. The brake resistance br is the total real train resistance force due to car brakes using operator brake control setting. It should be noted that there are additional factors that make up the total resistance associated with the train Computer 20 now calculates the total train resistance ttr using brake resistance br, calculated above, and sums the other resistance factors due to real car weight, real car journal resistance, and real car air resistance. Computer 20 uses the following formula:

$$ttr(t) = br(t) +$$

$$\sum_{n=1}^{n=\#ofcars} ((cwf \times wc(n)) + (jrf \times na(n) \times ts(t-1)) + ..$$

$$(arf \times sa(n) \times ts(t-1)^3)$$

wherein:
t=the value of this scheduled simulation time
br=brake resistance
cwf=car weight factor for convening weight of real train car to resistance
jrf=journal resistance factor
na=number of axles on real train car
arf=air resistance factor for converting real train car surface area to resistance
sa=surface area of real train
wc=weight of real train car
ts=train or track speed The total train resistance is the force that the real locomotive must overcome to move the train. Program execution continues at reference P of FIG. 5D.

Computer 20 now calculates work pw that the real locomotive is producing using the formula:

$$pw(n)(t) = hpo(n)(t) \times pcf$$

wherein:

t=the value of this scheduled simulation time n=range from 1 to the number of real locomotives hpo=horsepower output of real locomotive pcf=power conversion factor for converting horsepower to work With real locomotive power converted to work, computer 20 can calculate the total pulling force for real locomotives. Computer 20 calculates this using the formula:

$$lforce(n)(t) = \left( \frac{pw(n)(t)}{ts(t-1)} \right)$$

wherein:

t=the value of this scheduled simulation time n=range from 1 to the number of real locomotives pw=work produce by real locomotive ts=train or track speed Locomotive force can exceed the adhesion capabilities of steel wheel on steel rails. Sand can be applied to the rails by many real locomotives in front of said locomotives driving wheels. This increases the coefficient of friction between the real locomotive wheels and the rails allowing more force to be applied to the train without slipping the wheels. Computer 20 checks to see it the operator has activated the rail sanding switch. If it has then the rail coefficient of friction rcf is calculated as follows:

$$rcf(t)=ncf+scf(t)$$

wherein:

t=the value of this scheduled simulation time ncf=normal coefficient of friction for steel wheel on steel rail scf=sand coefficient of friction adjustment for sand between steel wheel on steel rail If the operator is not sanding the rails then the rail coefficient of friction rcfis calculated as follows:

$$rcf(t)=ncf$$

wherein:

t=the value of this scheduled simulation time ncf=normal coefficient of friction for steel wheel on steel rail Computer 20 now calculates the maximum force that can be applied by the locomotives without slipping the driving wheels on the rails. This force is determined by multiplying the total weight on the real locomotive driving wheels by the coefficient of friction between the real locomotive driving wheels and the rails. Computer 20 uses the following formula:

$$mlforce(n)(t)=wdw(n) \times rcf(t)$$

wherein:

n=range from 1 to the number of real locomotives t=the value of this scheduled simulation time wdw=real locomotive weight on driving wheels rcf=rail coefficient of friction It is important to note that while two formulas are presented above for calculating the coefficient of friction rcf, only one formula is used depending on rail sanding requests from the operator. Computer 20 now determines if the real locomotive wheels would be slipping for each real locomotive, where n=1 to n=maximum number of real locomotives in this real train. Program execution continues at reference Q in FIG. 5E. If the force produced by real locomotive lforce(n) exceeds the maximum track force mlforce(n), then the program warns the operator with a wheel slip warning on computer display 14 and on wheel slip indicator 210 of walkaround cab 30, if attached. The real locomotive force lforce(n) is set equal to zero. If the force the real locomotive lforce(n) is producing is less than the maximum track force mlforce(n) for this locomotive, then the real locomotive force lforce(n), remains unchanged. This process continues until all real locomotives have been analyzed for this train. Computer 20 now calculated the total train pulling force ttf using the force produced by the real locomotives lforce(n) and the total train resistance force ttr using following formula:

$$ttf(t) = 0 - ttr(t) + \sum_{n=1}^{n=\#oflocomotives} lforce(n)(t)$$

wherein:

t=the value of this scheduled simulation time n=range from 1 to the number of real locomotives ttr=total real train resistance lforce=force applied by real locomotive If is important to note that the total train pulling force ttf can be positive or negative. The ttr resistance and lforce are calculated above each of these forces is dependent on not only the number and types of real cars and real locomotives, but also operator input on brake throttle and rail sanding controls. The program now calculates the total train weight ttw using the following formula:

$$ttw = \sum_{n=1}^{n=\#oflocomotives} wl(n) + \sum_{n=1}^{n=\#ofcars} wc(n)$$

wherein:

wl=weight of real locomotive wc=weight of real train car

Computer 20 uses the total train weight ttw just calculated and the total train force ttf calculated above to determine the train acceleration ta using the formula:

$$ta(t) = \left( \frac{ttf(t) \times af}{ttw} \right)$$

wherein:

t=the value of this scheduled simulation time ttf=total train force af=force per unit weight acceleration conversion factor ttw=total train weight The train acceleration ta can evaluate to a positive or negative value. This is governed by the total train pulling force ttf calculated above, which could be negative or positive. If the train acceleration ta is negative, the train is decelerating. Computer 20 uses the train acceleration ta to calculate the new train or track speed ts as follows:

$$ts(t)=ts(t-1)+ta(t)$$

wherein:

t=the value of this scheduled simulation time ta=train acceleration

As stated above the train acceleration could be negative. If this is the case, the new train speed will be less than the speed determine at the previously scheduled time (t–1). Program execution continues at FIG. 5F reference R. In a preferred embodiment computer 20 now reschedules this train's next simulation time to (t+0.25). Computer 20 converts the train (or track) speed ts to a voltage by referencing the motor characteristics table to determine two sample points the desired scale speed lies between and calculates the ratio of volts to scale speed m is calculated using values in the motor characteristic table and the following formula:

$$m = \frac{(cv_x - cv_y)}{(cs_x - cs_y)}$$

wherein:

$cv_x$=calibration voltage for sample point x $cs_x$=calibrated scale speed for sample point x $cv_y$=calibration voltage for sample point y $cs_y$=calibrated scale speed for sample point y The motor characteristic table voltage vmct for model locomotive 10 is calculated using the following formula:

$$vmct(t)=(m \times ts(t))+sv$$

wherein:

m=ratio of volts to scale speed ts=desired scale track speed of model locomotive 10 sv=starting voltage of model locomotive 10

In a nominal calibration of model locomotive 10 one of the sample points becomes the starting voltage with the speed set to zero. The other voltage versus scale speed value is the single sample point taken during calibration. This ratio is a constant linear relationship for the nominal calibration process. It starts on the voltage axis at model locomotive 10 starting voltage and extends through the point defined by model locomotive 10 calibration voltage and corresponding scale speed. If model locomotive 10 was calibrated using the advanced calibration process, the correct vmct for model locomotive 10 is determined by performing a linear interpolation of the value between the two closest sample points in the table.

Computer 20 now adjusts the track output voltage tov value if necessary using the formula:

$$tov(t)=vmct(t)+lcfl(t)$$

wherein:

t=the value of this scheduled simulation time vmct=voltage from model locomotive 10 motor characteristic table lcf=load compensation from operator Computer 20 now outputs track output voltage tov to throttle circuit board 140. Computer 20 refreshes the operator control window on computer display 14, updating new train speed, acceleration and any warning indicators that may be required such as real locomotive wheel slip. The system time is then read, internal time updated and writing to computer display 14 and execution continues for the next operator control window and associated model at FIG. 5A reference S.

SUMMARY, RAMIFICATIONS, AND SCOPE

Accordingly, the reader will see the invention provides a model railroad control system which will control one or more model locomotives or trains in a manner which accurately simulates that of a real train. In addition, the invention provides the capability to accurately determine the operational characteristics of a model locomotive or locomotives operating as a multi-unit and save the characteristics. Furthermore, the invention has additional advantages in that:

it permits the identification and recall of the operational characteristics of the model or models operating as a multi-unit to be used on request at a later point in time;

it provides a model train control system which has similar controls and indicators to those found on real locomotives;

it provides a model railroad control system which utilizes performance data relating to the actual locomotive or locomotives being modeled;

it provides a model railroad control system which utilizes the real world physical effects present to a real train to determine the performance of a model locomotive or locomotives;

it provides a railway simulator which can simulate multiple trains operating on multiple tracks in real time;

it provides a railway simulator which utilizes a computer which is suitable for other tasks;

it provides a railway simulator which simulates the physical characteristics of single or multiple full size trains and applies the results to a single model train or multiple model trains; and it provides a simulator which has the ability to apply control to a model capable of movement.

Although the description above contains specificities, these should not be construed as limitations to the scope of the invention, but rather as an exemplification of one preferred embodiment thereof. For example, the invention could be used to control a model locomotive that accepts commands through remote control instead of altering the track voltage as in the preferred embodiment. Other ramifications include the use of different types of models such as: airplanes, ships, boats, cars, and most any air, sea, or land vehicle in which a computer can simulate the operation of the real vehicle and control the model whether it is powered or un-powered. In this manner it is felt the invention has additional ramifications in the areas of operator training, tests of skill, computer gaming, and virtual reality.

Thus the scope of the invention should be determined by the appended claims and their legal equivalents, rather than by the examples given.

I claim:

1. A system for controlling the operation of a model vehicle to simulate the operation of a real vehicle, comprising:

a model vehicle;

a storage device;

a simulated real vehicle control device operatively connected to the model vehicle, and a processor means having means for maintaining in the storage device a database containing a plurality of parameters related to performance characteristics and operational characteristics of a real vehicle;

means for maintaining in the storage device a database containing a plurality of parameters related to performance characteristics and operational characteristics of a model vehicle, which is a scale model of the real vehicle; and means for controlling the model vehicle in response to the simulated real vehicle control device, using the parameters related to the real and the model vehicles, so that the model vehicle simulates the operation of the real vehicle.

2. The system of claim 1 wherein the simulated real vehicle control device is comprised of means for maintaining a database of control elements related to the real vehicle in said processor means.

3. The system of claim 1 wherein the simulated real vehicle control device is comprised of a vehicle control panel operatively connected to the processor means.

4. The system of claim 1 wherein the database containing a plurality of parameters related to a real vehicle contains parameters which describe the real vehicle and parameters which describe conditions affecting the real vehicle.

5. The system of claim 1 wherein the model vehicle is a train for simulating the operation of a real train.

6. The system of claim 1 wherein the model vehicle is a sea vehicle for simulating the operation of a real sea vehicle.

7. The system of claim 1 wherein the model vehicle is a land vehicle for simulating the operation of a land vehicle.

8. The system of claim 1 wherein the model vehicle is a aircraft vehicle for simulating the operation of a real aircraft vehicle.

9. A system for controlling the operation of a model vehicle to simulate the operation of a real vehicle, comprising:

a model vehicle;

a processor;

a storage device;

a simulated real vehicle control device operatively connected to the model vehicle, and software means operative on the processor for:

(a) maintaining in the storage device a database containing a plurality of parameters related to performance characteristics and operational characteristics of a real vehicle;

(b) maintaining in the storage device a database containing a plurality of parameters related to performance characteristics and operational characteristics of a model vehicle, which is a scale model of the real vehicle; and (c) controlling the model vehicle in response to the simulated real vehicle control device, using the parameters related to the real and the model vehicles, so that the model vehicle simulates the operation of the real vehicle.

10. A system for controlling the operation of a model vehicle to simulate the operation of a real vehicle, comprising:

(a) means for maintaining a database containing a plurality of parameters related to performance characteristics and operational characteristics of a real vehicle;

(b) means for maintaining a database containing a plurality of parameters related to performance characteristics and operational characteristics of a model vehicle, which is a scale model of the real vehicle;

(c) simulated real vehicle control means operatively connected to the model vehicle for simulating operation of the real vehicle, and (d) means for controlling the model vehicle in response to the simulated real vehicle control means, using the parameters related to the real and the model vehicles, for operating the model vehicle so that the model vehicle simulates the operation of the real vehicle.

11. A method of controlling the operation of a model vehicle to simulate the operation of a real vehicle, comprising the steps of:

(a) electronically maintaining a database containing a plurality of parameters related to performance characteristics and operational characteristics of a real vehicle;

(b) electronically maintaining a database containing a plurality of parameters related to performance characteristics and operational characteristics of a model vehicle, which is a scale model of the real vehicle;

(c) providing a simulated real vehicle control means operatively connected to the model vehicle for simulating operation of the real vehicle, and the (d) electronically controlling the model vehicle in response to the simulated real vehicle control means, using the parameters related to the real and the model vehicles, for operating the model vehicle so that the model vehicle simulates the operation of the real vehicle.

12. A method for controlling the operation of a model vehicle to simulate the operation of a real vehicle by a digital computer, comprising the steps of operating a computer to:

(a) maintain a database containing a plurality of parameters related to performance characteristics and operational characteristics of a real vehicle;

(b) maintain a database containing a plurality of parameters related to a model vehicle, which is a scale model of the real vehicle;

(c) provide a simulated real vehicle control means operatively connected to performance characteristics and operational characteristics of the model vehicle for simulating operation of the real vehicle, and (d) control the model vehicle in response to the simulated real vehicle control means, using the parameters related to the real and the model vehicles, for operating the model vehicle so that the model vehicle simulates the operation of the real vehicle.

* * * * *